United States Patent
Muha et al.

(10) Patent No.: US 11,027,859 B2
(45) Date of Patent: Jun. 8, 2021

(54) VARIABLE STIFFNESS FLYER PLATE FOR PENETRATION DEVICE

(71) Applicant: THE BOEING COMPANY, Chicago, IL (US)

(72) Inventors: Nicholas B. Muha, Monmouth Junction, NJ (US); Jeremie Joel Albert, Philadelphia, PA (US); Robert W. Thomas, Hampton Cove, AL (US)

(73) Assignee: THE BOEING COMPANY, Chicago, IL (US)

( * ) Notice: Subject to any disclaimer, the term of this patent is extended or adjusted under 35 U.S.C. 154(b) by 630 days.

(21) Appl. No.: 15/785,223

(22) Filed: Oct. 16, 2017

(65) Prior Publication Data

US 2019/0112077 A1  Apr. 18, 2019

(51) Int. Cl.
| | | |
|---|---|---|
| *B64G 1/40* | (2006.01) | |
| *F42B 10/48* | (2006.01) | |
| *F42B 1/02* | (2006.01) | |
| *B64G 1/64* | (2006.01) | |

(52) U.S. Cl.
CPC ............... *B64G 1/402* (2013.01); *F42B 1/02* (2013.01); *F42B 10/48* (2013.01); *B64G 1/64* (2013.01)

(58) Field of Classification Search
CPC .......... B64G 1/402; B64G 1/64; B64G 1/401; F42B 10/48; F42B 1/02
See application file for complete search history.

(56) References Cited

U.S. PATENT DOCUMENTS

| | | |
|---|---|---|
| 3,196,791 A | 7/1965 | Francis et al. |
| 3,211,094 A | 10/1965 | Liddiard, Jr. |
| 3,517,615 A | 6/1970 | Jacobs |
| 3,599,573 A | 8/1971 | Sliney |
| 3,908,933 A | 9/1975 | Goss et al. |
| 4,649,824 A | 3/1987 | Guay |
| 5,044,282 A * | 9/1991 | Fuchs .................. F42B 1/02 102/475 |
| 5,117,758 A | 6/1992 | Renzi |
| 5,160,805 A | 11/1992 | Winter |
| 5,223,666 A * | 6/1993 | Delaney, Jr. ............ F41H 11/12 102/306 |
| 5,322,020 A | 6/1994 | Bernard et al. |
| 6,186,072 B1 | 2/2001 | Hickerson, Jr. et al. |

(Continued)

FOREIGN PATENT DOCUMENTS

| | | |
|---|---|---|
| FR | 1124550 | 4/1955 |
| GB | 2105825 | 3/1983 |
| GB | 2257774 A | 1/1993 |

OTHER PUBLICATIONS

European Search Report for Application No. 18188497.4 dated Feb. 11, 2019, 5 pgs.

(Continued)

*Primary Examiner* — Valentina Xavier
(74) *Attorney, Agent, or Firm* — Moore IP Law

(57) ABSTRACT

A penetration device including a casing, a propellant positioned in the casing, and a flyer plate. The flyer plate is coupled to the casing and adjacent to the propellant. The flyer plate includes a center portion having a substantially constant first thickness and includes a peripheral portion around the center portion and defining an edge. The peripheral portion includes one or more recesses in a first surface of the peripheral portion.

22 Claims, 22 Drawing Sheets

(56) References Cited

U.S. PATENT DOCUMENTS

| | | | |
|---|---|---|---|
| 7,063,020 B2 | 6/2006 | Eches et al. | |
| 7,299,735 B2 | 11/2007 | Alford | |
| 8,056,478 B2 | 11/2011 | Berlin et al. | |
| 9,022,116 B2 * | 5/2015 | Bell | E21B 43/117 166/297 |
| 9,303,961 B1 | 4/2016 | Frericks et al. | |
| 10,589,878 B2 | 3/2020 | Veto et al. | |
| 2010/0199875 A1 | 8/2010 | Weihrauch | |
| 2013/0133542 A1 | 5/2013 | Morris et al. | |
| 2016/0052649 A1 | 2/2016 | London | |
| 2017/0122259 A1 | 5/2017 | Kliger et al. | |
| 2019/0112076 A1 | 4/2019 | Albert et al. | |

OTHER PUBLICATIONS

European Search Report for Application No. 18188500.5 dated Feb. 11, 2019, 5 pgs.

Communication pursuant to Article 94(3) EPC for Application No. 18188497.4 dated Feb. 25, 2019, 7 pgs.

Communication Pursuant to Article 94(3) EPC for Application No. 18-188500.5 dated Feb. 25, 2019, 7 pgs.

Carpenter, Alexander J., et al., "Linking the equation of state for fiber-reinforced composites to those of the individual fiber and matrix constituents", Procedia Engineering, vol. 204, 2017, pp. 383-389.

Mulligan, P., et al., "The Effects of the Flyer Plate's Radius of Curvature on the Performance of an Explosively Formed Projectile," 2011, Shock Compression of Condensed Matter, American Institute of Physics Conference Proc., vol. 1426, pp. 1023-1026.

Jaramillo D., et al., "Effect of base plate thickness on wave size and wave morphology in explosively welded couples," 1987, Journal of Materials Science, vol. 22, pp. 3143-3147.

Communication pursuant to Article 94(3) EPC for Application No. 18188500.5 dated Aug. 26, 2019, 5 pgs.

Forquin, Pascal et al., A pulse-shaping technique to investigate the behaviour of brittle materials subjected to plate-impact tests, Phil. Trans. R. Soc. A375:20160333, 2016, doi.org/10.1098/rsta.2016.0333, pp. 1-16.

* cited by examiner

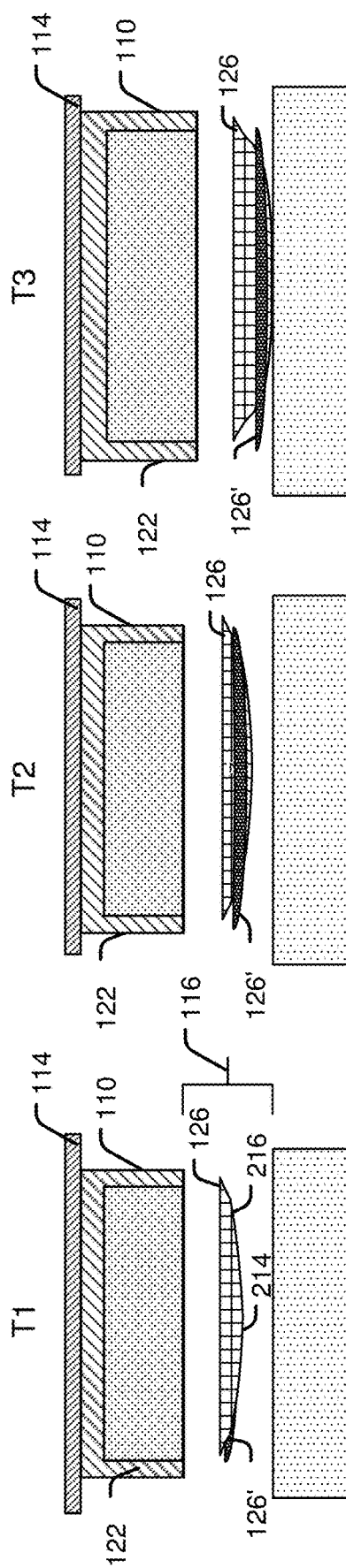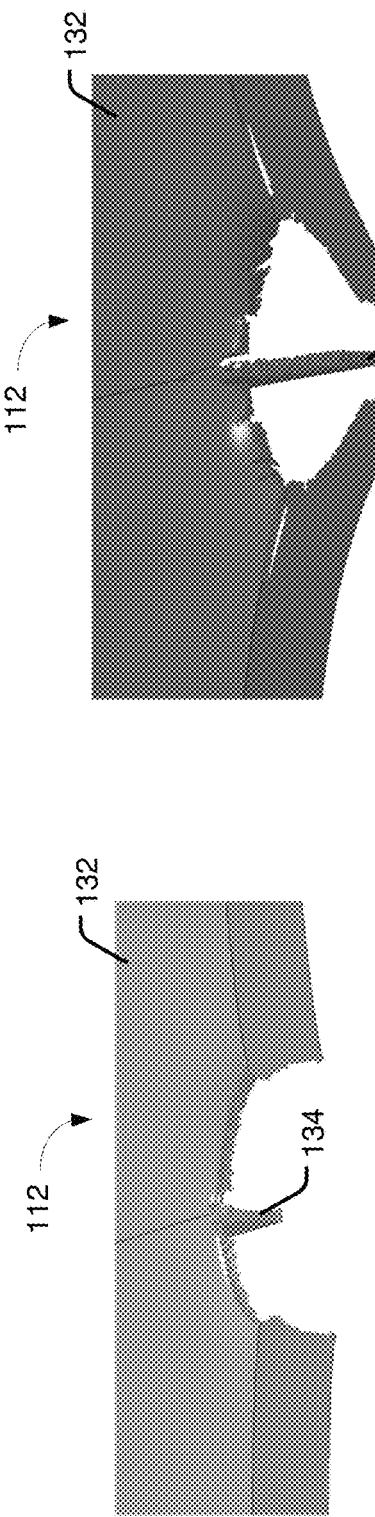

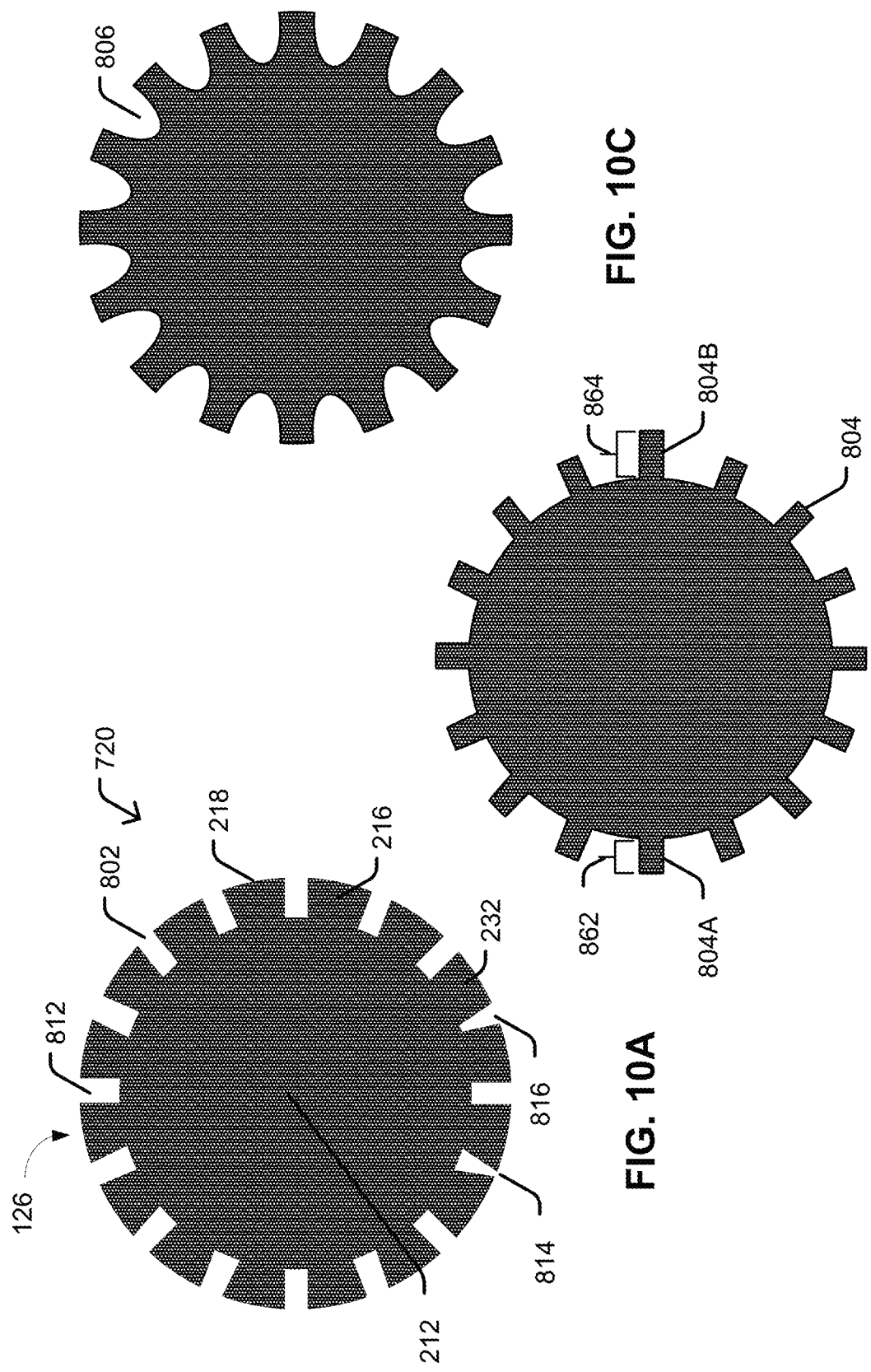

SECTIONS 950-950

SECTIONS 1050-1050

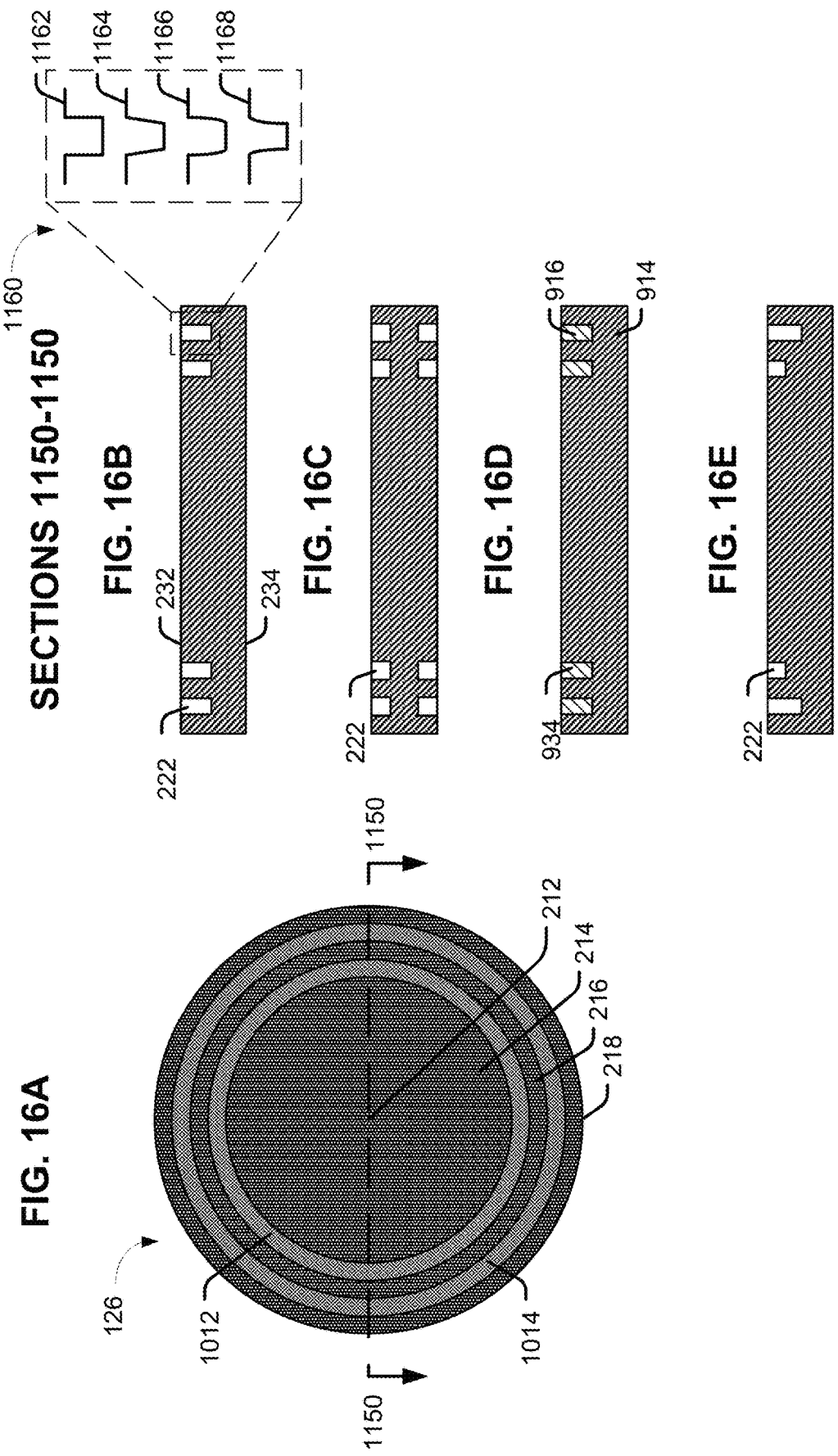

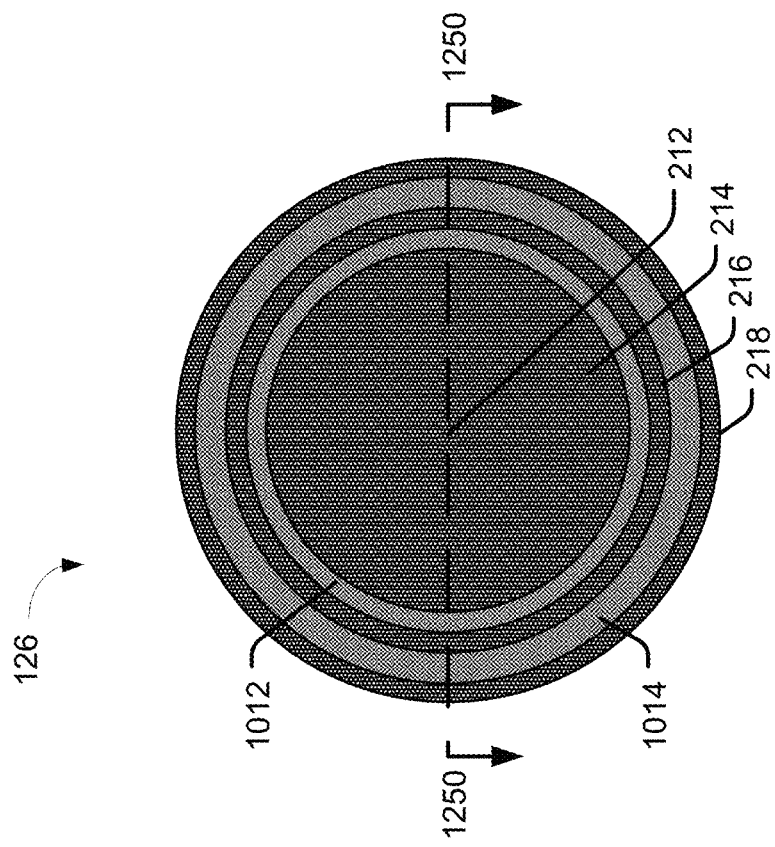
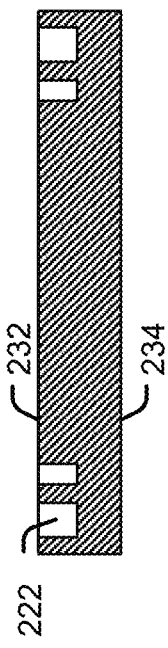
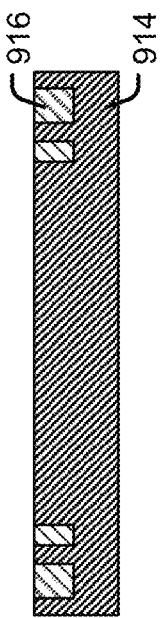

SECTIONS 1350-1350

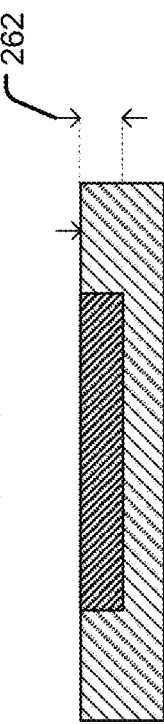
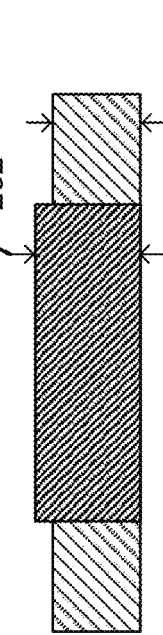
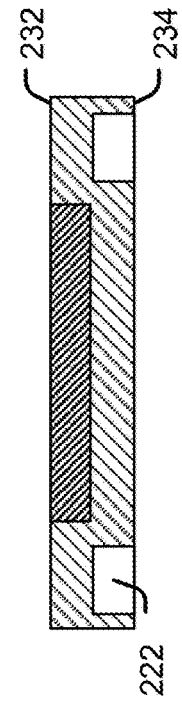
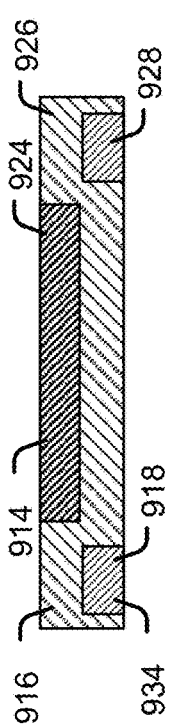
FIG. 19C
FIG. 19D
FIG. 19E
FIG. 19F
SECTIONS 1450-1450
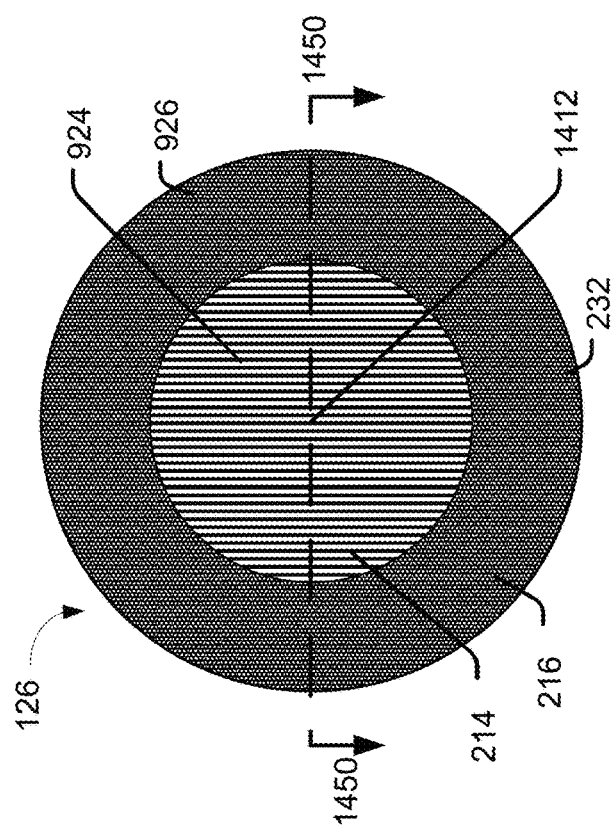
FIG. 19A
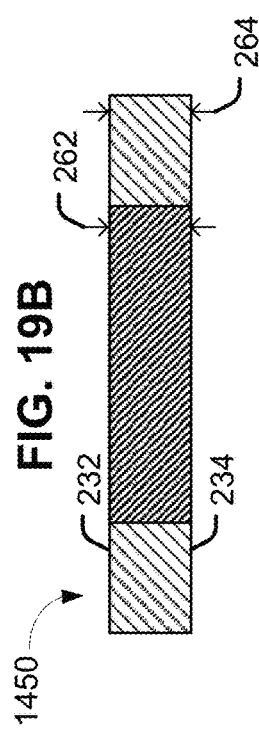
SECTION 1450-1450
FIG. 19B

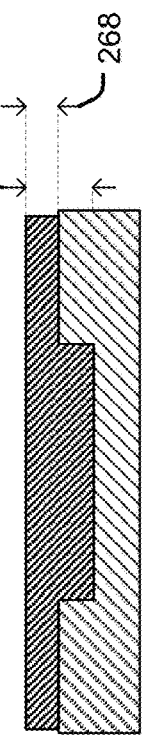
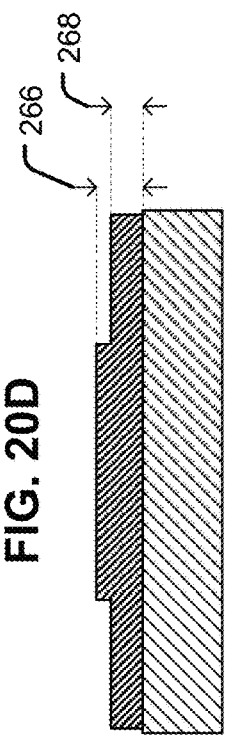
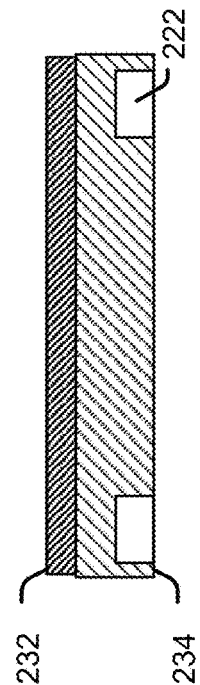
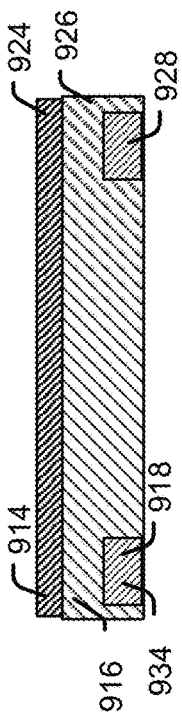
SECTIONS 1550-1550
FIG. 20C
FIG. 20D
FIG. 20E
FIG. 20F
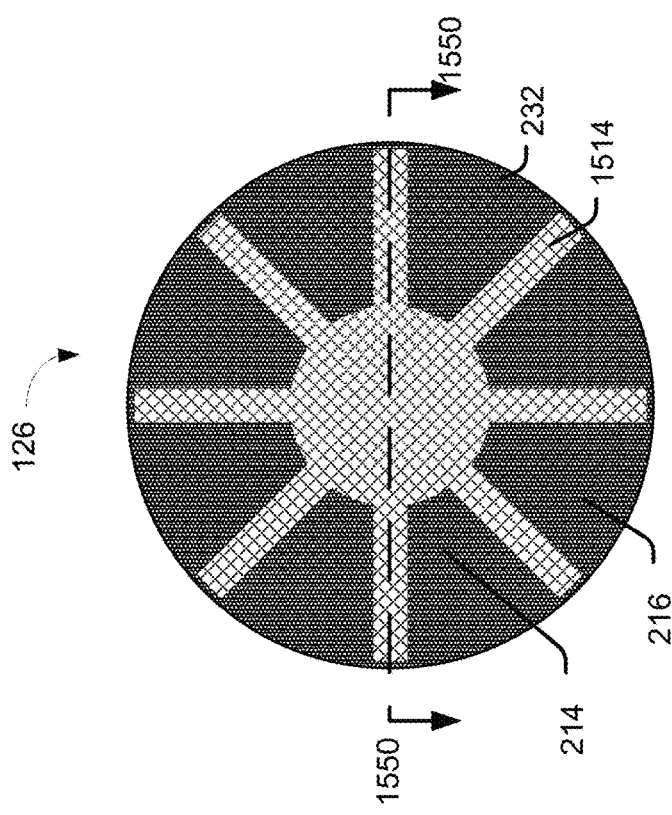
FIG. 20A
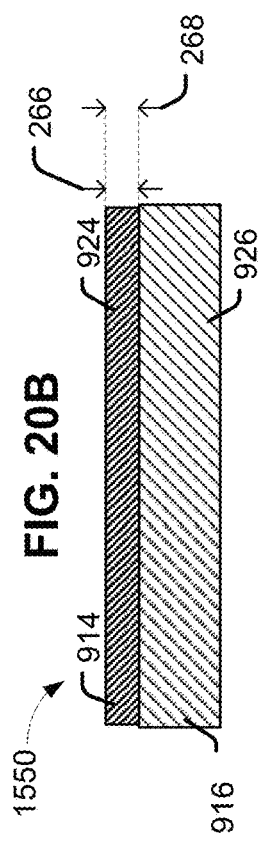
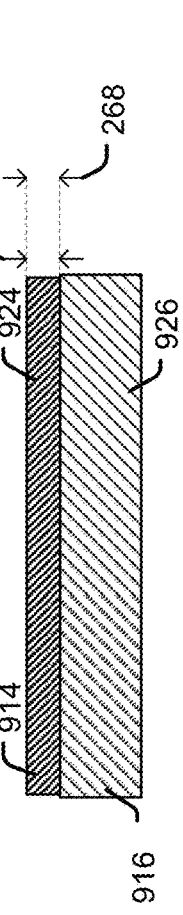
SECTION 1550-1550
FIG. 20B

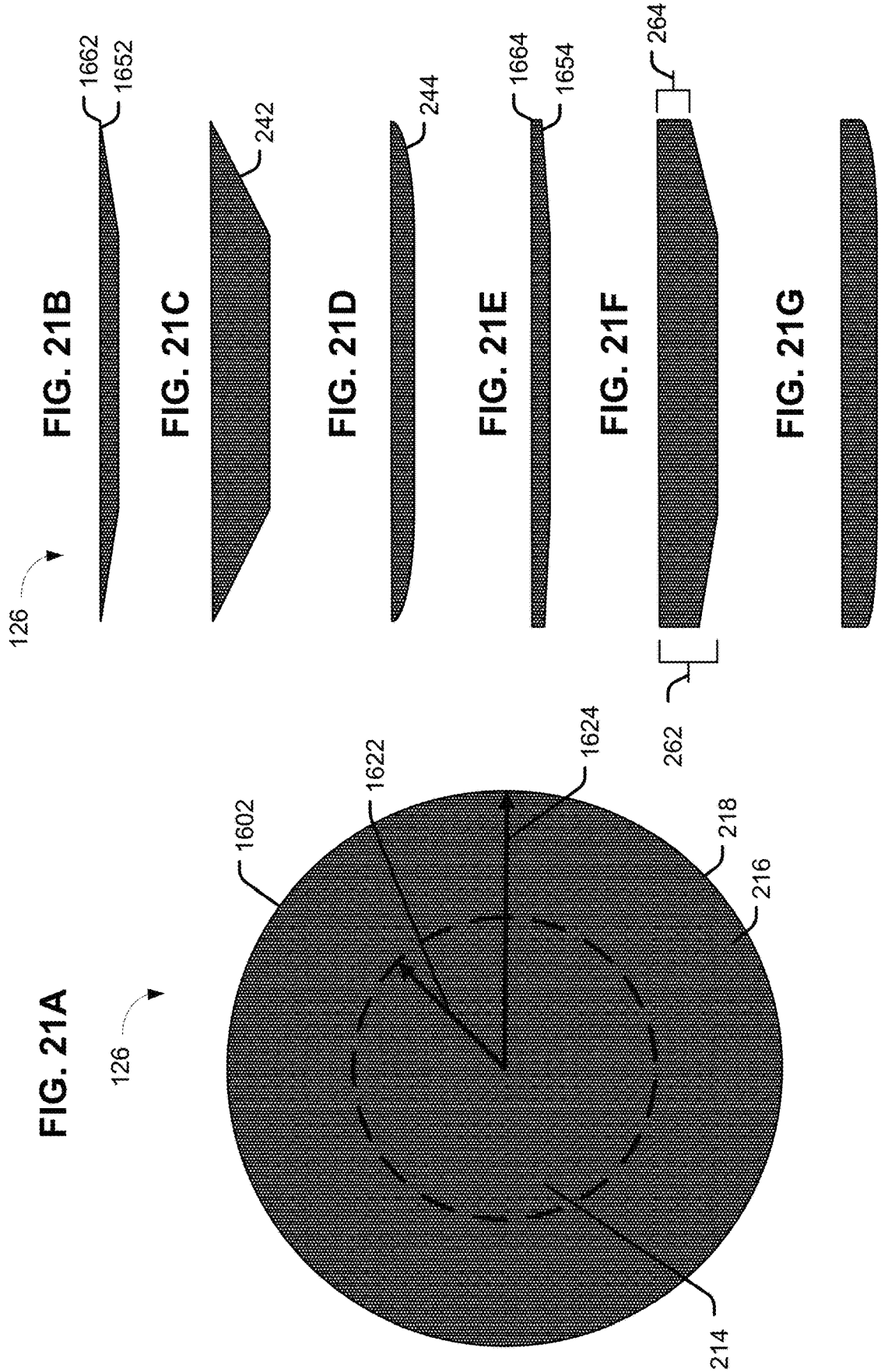

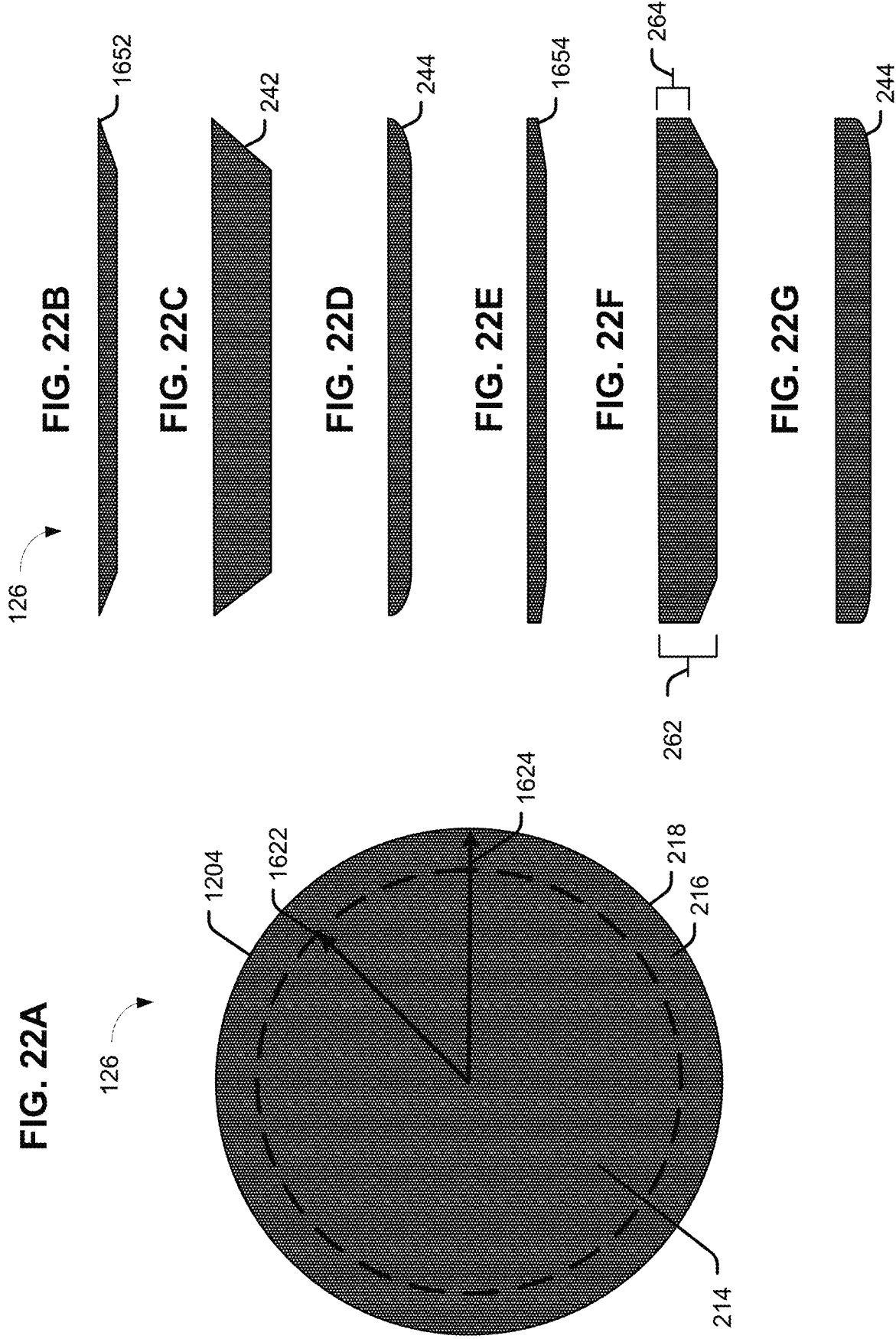

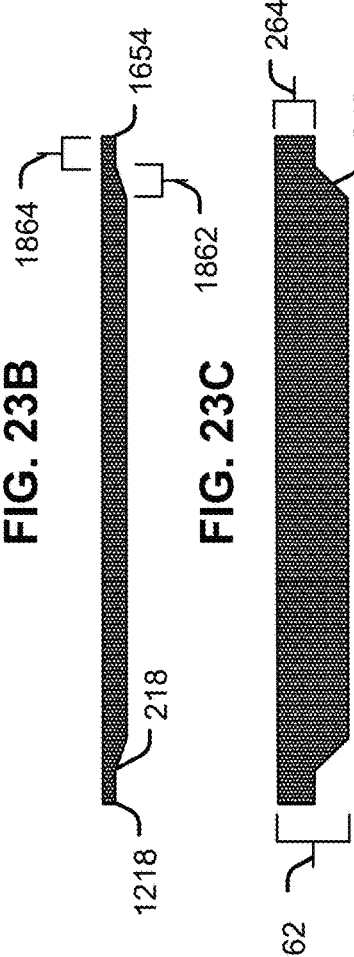
FIG. 23B
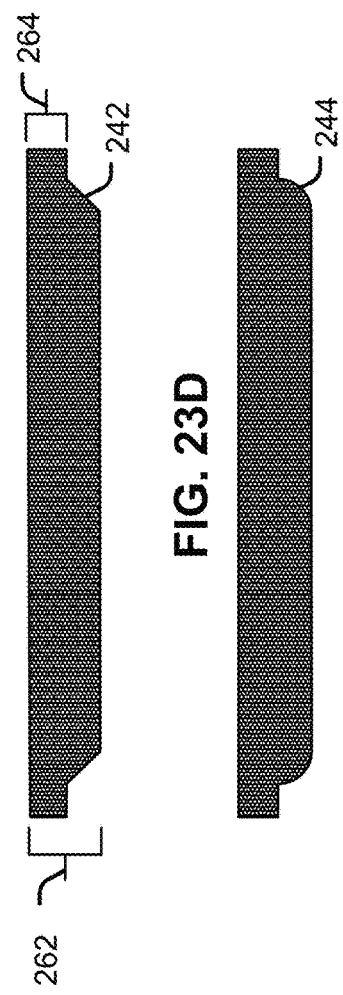
FIG. 23C
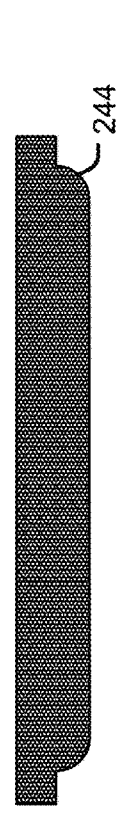
FIG. 23D
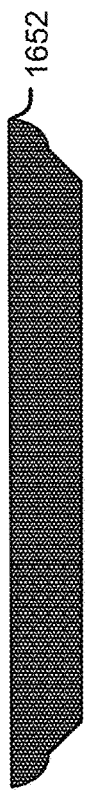
FIG. 23E
FIG. 23F
FIG. 23A
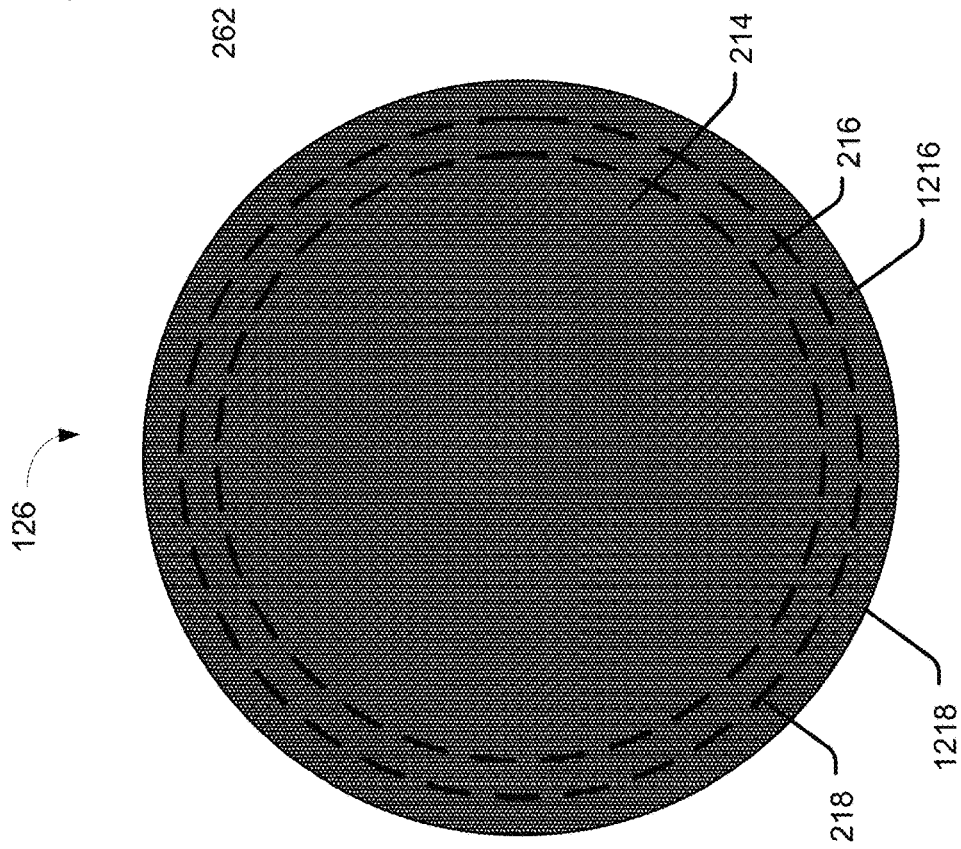

VARIABLE STIFFNESS FLYER PLATE FOR PENETRATION DEVICE

GOVERNMENT LICENSE RIGHTS

The invention described herein was made in the performance of work under NASA Contract No. NNM07AB03C and is subject to the provisions of Section 305 of the National Aeronautics and Space Act of 1958 (72 Stat. 435: 42 U.S.C. 2457). The Government has certain rights in this invention.

FIELD OF THE DISCLOSURE

The present disclosure is generally related to variable stiffness flyer plates of penetration devices.

BACKGROUND

Flight termination systems, such as those used in rocket-propelled vehicles or spacecraft, include penetration devices and are designed to generate a hole in a rocket's skin and sever support structure to make the rocket non-propulsive. Creating the hole through the rocket's skin reduces pressure of rocket propellant and allows the rocket propellant to vent to make the rocket non-propulsive.

Penetration devices generate holes and sever structure by propelling a flyer plate through the structure. Flyer plates having dense materials or relatively larger thicknesses remain intact after impact and generate primarily shear failure and create localized damage (e.g., punctures the skin and structure) with less residual damage as compared to flyer plates having compliant materials or relatively thinner thicknesses. Flyer plates having compliant materials or relatively thinner thicknesses deform or break apart on impact and are not effective at piercing thicker targets (e.g., rocket structure), but cause more bending stress and residual damage from deformation and fragmentation of the flyer plate.

Increasing size and weight of the penetration device to pierce thicker targets increases weight of the rocket-propelled vehicles or the spacecraft, which increases costs and decreases performance. Additionally, increasing blast pressure is less beneficial at higher standoffs (e.g., when the penetration device is positioned further away from the target).

SUMMARY

In a particular implementation, a penetration device includes a casing, a propellant positioned in the casing, and a flyer plate. The flyer plate is coupled to the casing and adjacent to the propellant. The flyer plate includes a center portion having a substantially constant first thickness and includes a peripheral portion around the center portion and defining an edge. The peripheral portion includes one or more recesses in a first surface of the peripheral portion.

In another particular implementation, a flight vehicle includes a component and penetration device. The component includes a skin and a plurality of support structures. The penetration device is positioned in proximity to the skin and one or more support structures of the plurality of support structures. The penetration device includes a casing, a propellant positioned in the casing, and a flyer plate. The flyer plate is coupled to the casing and is adjacent to the propellant. The flyer plate includes a center portion having a substantially constant first thickness and includes a peripheral portion around the center portion and defining an edge. The peripheral portion includes one or more recesses in a first surface of the peripheral portion.

In another particular implementation, a method of terminating flight of a vehicle includes receiving a termination signal at a penetration device. The method also includes triggering a propellant of the penetration device. The method further includes propelling a variable stiffness flyer plate of the penetration device into a skin and one or more support structures of the vehicle. The variable stiffness flyer plate includes a center portion having a substantially constant first thickness and includes a peripheral portion around the center portion and defining an edge. The peripheral portion includes one or more recesses in a first surface of the peripheral portion.

In another particular implementation, a penetration device includes a casing, a propellant positioned in the casing, and a flyer plate. The flyer plate is coupled to the casing and adjacent to the propellant. The flyer plate includes a center portion having a substantially constant first thickness and includes a peripheral portion around the center portion and defining an edge. The peripheral portion tapers from the first thickness to a second thickness at the edge, where the second thickness is less than the first thickness.

In another particular implementation, a flight vehicle includes a component and penetration device. The component includes a skin and a plurality of support structures. The penetration device is positioned in proximity to the skin and one or more support structures of the plurality of support structures. The penetration device includes a casing, a propellant positioned in the casing, and a flyer plate. The flyer plate is coupled to the casing and is adjacent to the propellant. The flyer plate includes a center portion having a substantially constant first thickness and includes a peripheral portion around the center portion and defining an edge. The peripheral portion tapers from the first thickness to a second thickness at the edge, where the second thickness is less than the first thickness.

In another particular implementation, a method of terminating flight of a vehicle includes receiving a termination signal at a penetration device. The method also includes triggering a propellant of the penetration device. The method further includes propelling a variable thickness flyer plate of the penetration device into a skin and one or more support structures of the vehicle. The variable thickness flyer plate includes a center portion having a substantially constant first thickness and includes a peripheral portion around the center portion and defining an edge. The peripheral portion tapers from the first thickness to a second thickness at the edge, where the second thickness is less than the first thickness.

In another particular implementation, a penetration device includes a casing, a propellant positioned in the casing, and a flyer plate. The flyer plate is coupled to the casing and is adjacent to the propellant. The flyer plate includes a center portion having a first density and a peripheral portion around the center portion and defining an edge. The peripheral portion includes multiple regions having a second density, where the first density is different than the second density.

The features, functions, and advantages described herein can be achieved independently in various implementations or may be combined in yet other implementations, further details of which can be found with reference to the following description and drawings.

BRIEF DESCRIPTION OF THE DRAWINGS

FIGS. 4A, 4B, and 4C are each a diagram that illustrates an example of deformation of an examples of flyer plates;

FIGS. 5A and 5B are each a diagram that illustrates damage caused by the examples of flyer plates of FIGS. 4A-4C;

FIG. 10A is a diagram that illustrates an example of a flyer plate having a plurality of notches;

FIG. 10B is a diagram that illustrates an example of a flyer plate having a plurality of teeth;

FIG. 10C is a diagram that illustrates an example of a flyer plate having a plurality of scallops;

FIG. 16A is a diagram that illustrates another example of a variable stiffness flyer plate having partial recesses in the form of concentric channels;

FIGS. 16B, 16C, 16D, and 16E are each a diagram that illustrates cross sections of examples of the variable stiffness flyer plate having recesses in the form of concentric channels;

FIG. 17A is a diagram that illustrates yet another example of a variable stiffness flyer plate having recesses in the form of concentric channels;

FIGS. 17B, 17C, and 17D are each a diagram that illustrates a cross section of an example of the variable stiffness flyer plate having recesses in the form of concentric channels;

FIG. 19A is a diagram that illustrates a bottom view of an example of a variable density flyer plate having a dense insert;

FIGS. 19B, 19C, 19D, 19E, and 19F are each a diagram that illustrates a side view of an example of the variable density flyer plate having a dense insert;

FIG. 20A is a diagram that illustrates a bottom view of an example of a variable density flyer plate having a plurality of supports;

FIGS. 20B, 20C, 20D, 20E, and 20F are each a diagram that illustrates a side view of an example of the variable density flyer plate having a plurality of supports;

FIG. 21A is a diagram that illustrates a bottom view of an example of a variable thickness flyer plate having a single peripheral portion;

FIGS. 21B, 21C, 21D, 21E, 21F, and 21G are each a diagram that illustrates a side view of an example of the variable thickness flyer plate having a single peripheral portion;

FIG. 22A is a diagram that illustrates a bottom view of another example of a variable thickness flyer plate having a single peripheral portions;

FIGS. 22B, 22C, 22D, 22E, 22F, and 22G are each a diagram that illustrates a side view of an example of the variable thickness flyer plate having a single peripheral portion;

FIG. 23A is a diagram that illustrates a bottom view of an example of a variable thickness flyer plate having two peripheral portions;

FIGS. 23B, 23C, 23D, 23E, 23F, 23G, 23H, 23I, 23J, 23K, 23L, 23M, 23N, 23O, 23P, 23Q, and 23R are each a diagram that illustrates a side view of an example of the variable thickness flyer plate having two peripheral portions;

DETAILED DESCRIPTION

Figure 1:
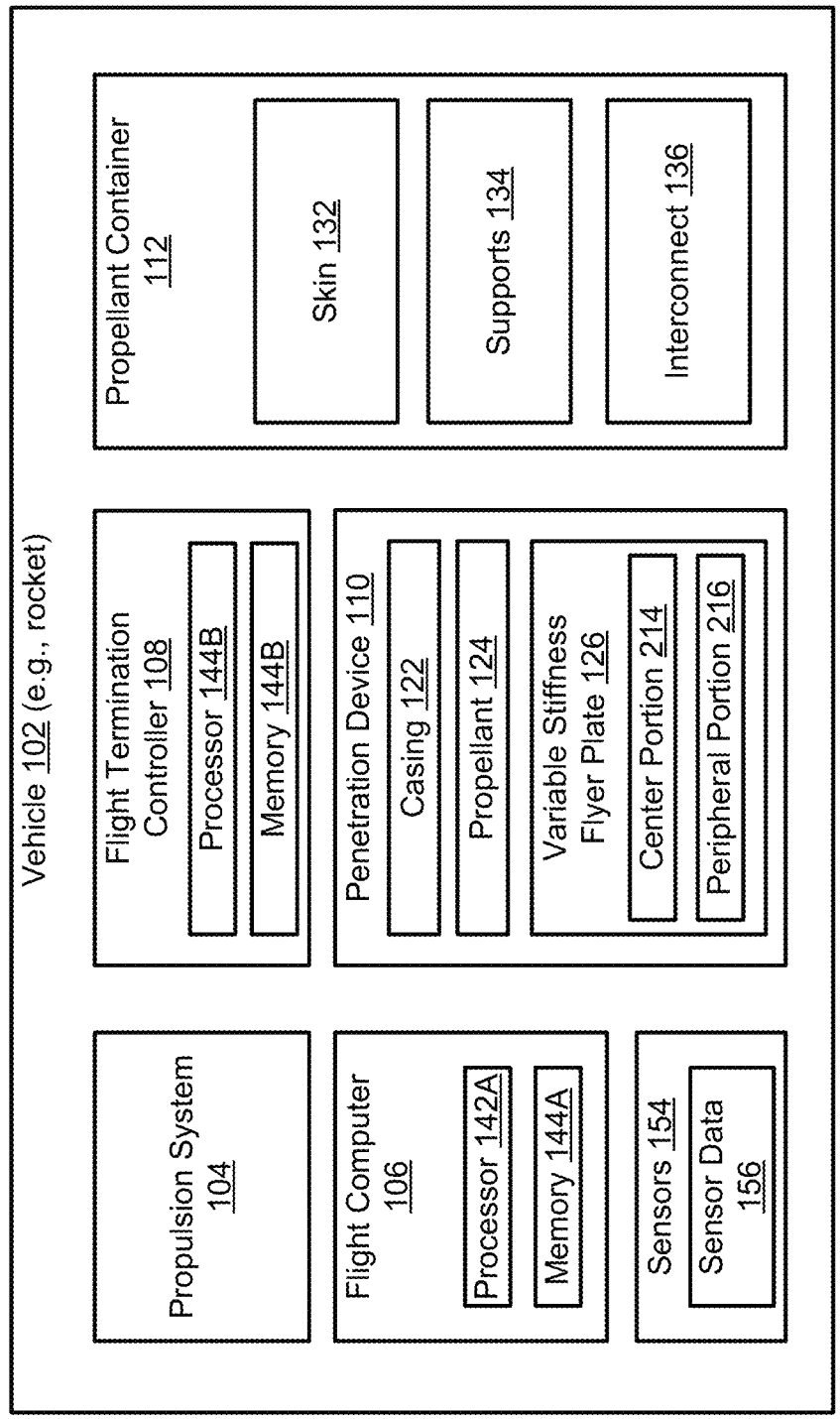
FIG. 1 is a block diagram that illustrates a vehicle including a penetration device having a variable stiffness flyer plate.

Implementations described herein are directed to penetration devices having variable stiffness flyer plates. A penetration device includes a casing to house a propellant, that when triggered, propels the variable stiffness flyer plate towards a target. The propellant may include or correspond to a cylindrical or "pancake" charge, as opposed to a linear shape charge or a conical (e.g., domed or curved) shape charge. One exemplary use case for penetration devices is in a flight termination system. Other example use cases for penetrations devices include building penetration devices, penetration devices for non-flying vehicles, penetration devices for pressure vessels, and penetration devices for metallic objects.

A flight termination system employs one or more penetration devices to terminate flight of a rocket or a rocket-propelled vehicle (e.g., a spacecraft, an aircraft, a missile, etc.) by penetrating a propellant container surface and enabling pressure loss and propellant drainage, by severing structural load paths to induce vehicle breakup, severing propellant feed into the engine(s), or a combination thereof. The vehicle's propellant container may contain fuel, oxidizer, or a mixture thereof. To illustrate, a liquid propellant container is punctured to reduce pressure in the liquid propellant container, which reduces or stops fuel flow to the engine(s). Penetrating the liquid propellant container surface also allows propellant drainage, which further reduces propulsion and vents the rocket propellant. Additionally, puncturing the liquid propellant container may sever a structural load path of the vehicle and induce vehicle breakup. As another illustration, a casing and supports of a solid rocket motor may be punctured and severed to split the casing and generate subsequent breakup due to a loss of structural capability. A penetration device is coupled in proximity to the propellant container with the flyer plate facing the propellant container.

The variable stiffness flyer plates disclosed herein include a center portion having a first stiffness and one or more peripheral portions around the center portion having a second stiffness less than the first stiffness, include materials having a different stiffnesses (e.g., different Young's moduli), or both. Examples of variable stiffness flyer plates include flyer plates having different thicknesses at different locations of the flyer plate, flyer plates with portions of material removed (e.g., a recess), flyer plates of a first material with inserts of a second material, flyer plates with support structures or braces, or a combination thereof, as described further herein. In additional to generating shear loading in the center of the flyer plate, a variable stiffness flyer plate alters the loading generated during the impact event by the peripheral portion of the flyer plate as compared to flat flyer plates (uniform thickness and stiffness flyer plates). To illustrate, in variable geometry flyer plates (e.g., variable thickness flyer plates and flyer plates with portions of material removed), a shear load is transitioned to a bending load by reducing the thickness of the material in the peripheral portion or regions thereof (which reduces the stiffness, inertia, and strength of the plate in the peripheral portion or regions thereof). The shear load is discontinuous by altering the local features of the flyer plate (e.g., local removal of material, inserts, supports, or scallops).

A variable thickness flyer plate enables the peripheral portion of the flyer plate to strike a target, such as a propellant container of a rocket, at substantially the same time as the center portion, delivering higher loads to the target. The higher loads may also be caused by the peripheral portion not inducing the target to fail upon impact. As compared to constant thickness and constant stiffness flyer plates, the peripheral portion of the variable thickness flyer plates strikes the target nearer in time after detonation and at a higher velocity. This allows the flyer plate to create higher loads (including adjacent loads) and impact forces on the target.

To illustrate, in variable thickness flyer plates, a thickness of the peripheral portion is varied radially from the center portion to customize local flyer plate stiffness and inertia. The customized local flyer plate stiffness and inertia adjusts the impact shape for improved load transfer. The change in thickness near the outer radius of the flyer plate also allows a non-uniform flyer plate response upon impact with the target, increasing adjacent loading to the target, which creates residual damage. Increasing the loading applied to the target and increasing the damage area is beneficial to sever thicker structure and to create larger reductions in pressure faster.

By using flyer plates having variable stiffness, a smaller, lighter, and less costly penetration device may be used to puncture skin and structure and generate residual damage, as compared to using flyer plates having uniform stiffness (e.g., flat or uniform thickness flyer plates). Flyer plates having variable stiffness generate more residual damage than flyer plates made of dense materials and have better piercing ability than flyer plates made of compliant materials. Thus, a rocket or rocket-propelled vehicle having one or more penetration devices that have variable stiffness flyer plates may have fewer penetration devices or smaller penetration devices than flyer plates having uniform stiffness (e.g., flat or uniform thickness flyer plates). Consequently, weight and costs of the rocket or rocket-propelled vehicle are reduced. Additionally or alternatively, flight or propulsion of the rocket or rocket-propelled vehicle may be terminated or reduced more quickly as compared to rockets that include penetration devices that have uniform stiffness flyer plates (e.g., substantially constant stiffness) because the penetration devices that have variable stiffness flyer plate penetrate thicker structures and generate a larger damage area.

FIG. 1 is a block diagram 100 that illustrates an example of a vehicle 102. In the examples described herein, the vehicle 102 is a spacecraft or component of a spacecraft, such as a rocket; however, the vehicle 102 can be any suitable vehicle. The vehicle 102 includes a propulsion system 104, a flight computer 106, and a penetration device 110, having a variable stiffness flyer plate 126, also referred to herein as flyer plate 126. In some implementations, the vehicle 102 further includes a flight termination controller 108, a propellant container 112, one or more sensors 154, or a combination thereof. The propulsion system 104 includes a rocket-based propulsion system. The propulsion system 104 is configured to propel the vehicle 102 by rocket propulsion. The propulsion system 104 may include one or more rocket-based propulsion systems. For example, the propulsion system 104 includes one or more liquid rocket motors, solid rocket motors, hybrid rocket motors, or a combination thereof. In some implementations, the propulsion system 104 further includes other (e.g., non-rocket-based) propulsion devices. For example, the vehicle 102 may include an aircraft with a reciprocating engine or a jet engine (e.g., a ramjet or scramjet engine).

The propulsion system 104 includes rocket propellant and a nozzle. The penetration device 110 may be configured to reduce pressure of the rocket propellant, reduce pressure in the nozzle, or a combination thereof. In some implementations, the rocket propellant is stored in the propellant container 112.

The propellant container 112 is configured to store rocket propellant for the propulsion system 104. In some implementations, the propellant container 112 is a component of the propulsion system 104. The propellant container 112 includes a skin 132 and a plurality of supports 134. The propellant container 112 may include or correspond to a pressurized propellant tank, such as a fuel tank, an oxidizer tank, or both. For example, the propellant container 112 may include two chambers, one for fuel and another for oxidizer or a single chamber for a monopropellant (e.g., a mixture of fuel and oxidizer).

The skin 132 includes or corresponds to an exterior of the propellant container 112 and is configured to store contents of the propellant container 112. The plurality of supports 134 include or correspond to ribs of the propellant container 112 and are configured to support the skin 132. In some implementations, the skin 132 is on an exterior of the propellant container 112 and surrounds the plurality of supports 134, which are on an interior of the propellant container 112.

In some implementations, the propellant container 112 further includes one or more interconnects 136. The one or more interconnects 136 include or correspond to joints or couplings where the skin 132, one or more supports of the plurality of supports 134, or a combination thereof, are connected or are in contact. For example, a particular interconnect 136 includes two supports 134 of the plurality of supports 134 coupled to each other and to the skin 132. In some implementations, the one or more interconnects 136 include or correspond to fasteners, connectors, or welded joints. For example, a particular interconnect 136 includes a frame configured to receive and couple to multiple supports of the plurality of supports 134.

In other implementations, such as when the propulsion system 104 includes a solid rocket motor, the propellant container 112 includes or corresponds to a second casing or a rocket casing. The second casing is configured to house solid rocket propellant of the solid rocket motor. In such implementations, the second casing includes a second skin, a plurality of second supports, and one or more second interconnects 136, similar to the skin 132, the plurality of supports 134, and the one or more interconnects 136.

The flight computer 106 includes a processor 142A and a memory 144A. The memory 144A is configured to store instructions executable by the processor 142A, and the processor 142A is configured to execute the instructions. The flight computer 106 is configured to control or adjust propulsion generated by the propulsion system 104, such as to direct thrust, adjust fuel flow rate, etc. The flight computer 106 is further configured to generate a flight termination command based on a flight termination input, sensor data 156, or a combination thereof. For example, the flight computer 106 generates the flight termination command responsive to a user input, such as from a remote operator or mission control. As another example, the flight computer 106 receives the sensor data 156 from the sensors 154 on board the vehicle 102, from other systems (e.g., non-vehicle sensors 154), or a combination thereof, and compares the sensor data 156 to one or more conditions or thresholds, and generates the flight termination command. The flight computer 106 sends the flight termination command to the flight termination controller 108 or the penetration device 110.

The flight termination controller 108 includes a processor 142B and a memory 144B. The memory 144B is configured to store instructions executable by the processor, and the processor 142B is configured to execute the instructions. The flight termination controller 108 is configured to control or activate (e.g., trigger) one or more penetration devices 110 of the vehicle 102. The flight termination controller 108 and the one or more penetration devices 110 may correspond to a flight termination system 2230 (shown in FIG. 26) of the vehicle 102. The flight termination controller 108 may be included in or separate from the flight computer 106. Additionally, the flight termination controller 108 may be included in or separate from the penetration device 110.

In some implementations, the flight termination controller 108 is configured to generate the flight termination command based on the flight termination input, the sensor data 156, or a combination thereof, and independent of receiving a flight termination signal or command from the flight computer 106. The flight termination controller 108 is configured to generate control signals to control the penetration device 110, activate the propellant 124, or both. For example, the flight termination controller 108 is configured to change a state of the penetration device 110. To illustrate, the flight termination controller 108 may instruct the penetration device 110 to be in an armed state or a disarmed state. As another example, the flight termination controller 108 is configured to activate the penetration device 110. For example, the flight termination controller 108 is configured to trigger, ignite, or detonate the propellant 124. To illustrate, the flight termination controller 108 sends a control signal to an ignition device or a triggering device to generate heat, pressure, or both.

The penetration device 110 is communicatively coupled to the flight computer 106, the flight termination controller 108, or both. The penetration device 110 is configured to terminate flight of the vehicle 102 responsive to receiving the flight termination command from the flight computer 106, the flight termination controller 108, or both. The penetration device 110 includes a casing 122, the propellant 124, and a flyer plate 126. The casing 122 includes or corresponds a housing of the penetration device 110. The casing 122 is configured to house the propellant 124 and is coupled to the flyer plate 126. The casing 122 is configured to contain and direct a force generated by the propellant 124. In some implementations, the casing 122 has a circular cross section.

The propellant 124 of the penetration device 110 is configured to generate a force (e.g., by exploding, detonating, deflagrating, reacting, igniting, etc.) to detach the flyer plate 126 and to propel or accelerate the flyer plate 126 into an object. The propellant 124 may include or correspond to a solid explosive. In some implementations, the propellant is substantially flat and has a substantially constant thickness. The propellant 124 may have (or be formed into) a disc shape or a cylindrical shape. In a particular implementation, the propellant 124 includes or corresponds to a cylindrical or "pancake" charge. In some implementations, the propellant 124 is hermetically sealed within the casing 122 by the casing 122 and the flyer plate 126.

The flyer plate 126 is coupled to the casing 122 and is a variable stiffness flyer plate. For example, as shown in FIG. 2, the flyer plate 126 includes a center portion 214 having a first stiffness 252 and one or more peripheral portions 216 around the center portion 214 having a second stiffness 254 less than the first stiffness 252, include materials having a different stiffnesses (e.g., different Young's moduli), or both. Factors in addition to stiffness contribute to the increased penetration and peripheral damage of the flyer plate 126. For example, inertia (e.g., momentum or resistance to change in speed) and strength of material (e.g., yield strength, compressive strength, impact strength, hardness, or a combination thereof) also contribute to causing the increased penetration and peripheral damage. The flyer plate 126 may include a flyer plate having a recess, a variable thickness flyer plate, or a variable density flyer plate. For example, the flyer plate 126 has portions or regions of removed material (e.g., a recess), a variable (e.g., non-constant) thickness, a variable density (e.g., two materials with different densities), or a combination thereof.

As described further below, the flyer plate 126 includes a center portion 214 and a peripheral portion 216. The center portion 214 has a substantially constant first thickness. For example, the center portion 214 does not include a recess or a hole and does not have a taper. The peripheral portion 216 is positioned around or about the center portion 214 and defines an edge 218. In some implementations, the edge 218 includes or corresponds to a peripheral edge of the flyer plate 126. In other implementations, such as the implementation shown in FIG. 26A, the flyer plate 126 further includes a second peripheral portion 1216 around or about the peripheral portion 216 and the second peripheral portion 1216 defines the peripheral edge. The second peripheral portion 1216 may have a substantially constant thickness or be tapered.

The peripheral portion 216 has a different stiffness than the center portion 214. For example, the peripheral portion 216 (or regions thereof) may have less mass and stiffness per unit area than the center portion 214. To illustrate, the peripheral portion 216 may have a reduced thickness, a lower density material, regions of material removed, or a combination thereof, to produce the reduced stiffness per unit area as compared to the center portion 214.

The peripheral portion 216 has a different inertia than the center portion 214. For example, the peripheral portion 216 (or regions thereof) may have less inertia per unit area than the center portion 214. The reduced thickness, the lower density material, the regions of material removed, or a combination thereof, of the peripheral portion 216 may produce the reduced inertia per unit area as compared to the center portion 214.

In some implementations, the peripheral portion 216 includes multiple regions with recesses. The recesses may include holes (e.g., blind holes or cavities), through holes, channels, or a combination thereof, as described with reference to FIGS. 9A-18C. In a particular implementation, a second material having a different density is inserted into or formed in the recesses, as described further with reference to FIGS. 11A-11C and 19A-20F.

In variable thickness implementations, the peripheral portion 216 tapers from the first thickness 262 to a second thickness 264. In some variable thickness implementations, the peripheral portion 216 has a substantially constant taper, such as linear taper 242. In other implementations, the peripheral portion 216 has a non-constant or a non-linear taper 244 (e.g., a progressive taper or a regressive taper) and includes a curved surface and the edge 218 is a rounded edge, as illustrated in FIG. 21D. To illustrate, the peripheral portion 216 may have a concave or convex shape. The non-linear taper 244 may have a constant or variable rate of change in taper.

In some variable thickness implementations, the second thickness is non-zero, as described with reference to FIG. 21E. For example, the peripheral portion 216 includes a substantially 90 degree curved edge 1664 near or coupled to the casing 122. In some implementations, the second thickness is approximately zero, as described with reference to FIG. 21B. For example, the peripheral portion 216 tapers to an angled curved edge 1662 near or coupled to the casing 122.

Figure 23G:

In some variable thickness implementations, the second peripheral portion 1216 has a substantially constant thickness of the second thickness 264. In other implementations, the second peripheral portion 1216 tapers from the second thickness 264 to a third thickness 266, as illustrated in FIG. 23G. The third thickness 266 may be non-zero 1654 or approximately zero 1652, as described with reference to the second thickness 264.

In some implementations, the flyer plate 126 is a unitary structure. For example, the flyer plate 126 is made of or formed from a single piece of material such that the center portion 214 and the peripheral portion(s) 216, 1216 are formed unitarily as one-piece. The single piece of material may include or correspond to a metal, an alloy, or a ceramic metal-matrix composite. In other implementations, the flyer plate 126 is made of multiple structures and includes a first material and a second material. In such implementations, the first and second material may include or correspond to a metal, an alloy, or a ceramic metal-matrix composite. For example, the center portion 214 is formed of the first material, the peripheral portion(s) 216, 1216 is formed from the second material, and the center portion 214 and the peripheral portions(s) 216 are coupled together.

The penetration device 110 is capable of rendering the propulsion system 104 of the vehicle 102 non-propulsive or reducing propulsion of the propulsion system 104 to terminate flight of the vehicle 102. In some implementations, the vehicle 102 includes multiple penetration devices 110. For example, the vehicle 102 includes one or more first penetration devices 110 positioned in proximity to a first propellant container 112 (e.g., a liquid fuel tank) of the vehicle 102 and one or more second penetration devices 110 positioned in proximity to second propellant container 112 (e.g., an oxidizer tank) of the vehicle 102. As another example, the vehicle 102 can include one or more penetration devices 110 positioned in proximity to a seam of a propellant container 112 (e.g., a rocket casing of a solid or liquid rocket) of the vehicle 102.

During operation or flight of the vehicle 102 (e.g., operation of the propulsion system 104), the flight computer 106 generates a flight termination command. For example, the flight computer 106 receives a flight termination signal from a remote operator or determines that the sensor data 156 satisfies one or more of the flight termination conditions. The flight termination conditions may include conditions or thresholds corresponding to location, heading, speed, fuel burn rate, pressure, time, or a combination thereof. The flight computer 106 sends the flight termination command to the penetration device 110 or to the flight termination controller 108. Responsive to receiving the flight termination command, the flight termination controller 108 or the penetration device 110 activates (e.g., triggers, detonates, or ignites) the propellant 124. The propellant 124 reacts (e.g., explodes) to generate a force. The casing 122 contains and directs the force towards the flyer plate 126 and the flyer plate 126 detaches from the casing 122. The flyer plate 126 is propelled or accelerated by the force and impacts the one or more components of the vehicle 102. In a particular implementation, the flyer plate 126 impacts the skin 132 of the propellant container 112 and generates a hole in the skin 132 and peripheral structural damage (e.g., bending, deforming, rupturing, cracking, etc.) around the hole. Additionally, the flyer plate 126 impacts (directly or via the skin 132) one or more supports 134, a particular interconnect 136, or both, and severs (e.g., completely severs or decouples) the one or more supports 134 and the particular interconnect 136.

The hole and structural damage generated by the flyer plate 126 reduces pressure in the propellant container 112. In some implementations, pressurized contents of the propellant container 112 escape or leak through the hole in the skin 132. The reduction in pressure and leaking propellant causes the vehicle 102 to terminate flight and reduces or stops the propulsion system 104 from generating thrust. To illustrate, the reduction in pressure may reduce or stop combustion of the rocket propellants, such as by reducing or stopping the flow of rocket propellants to the propulsion system 104. In some implementations, multiple penetration devices are used to completely sever multiple supports 134 and interconnects 136 in a region of the propellant container 112 or along a seam of the propellant container 112. Completely severing the multiple supports 134 and interconnects 136 may cause the propellant container 112 to split open or into multiple pieces to reduce pressure and terminate propulsion and flight of the vehicle 102.

In some implementations, the penetration device 110 is coupled to a mount or stand-off and positioned in proximity to a target, as described with reference to FIG. 3, with the center portion 214 of the flyer plate 126 is directed or aimed at the target. In other implementations, the penetration device 110 is coupled to the target.

In other implementations, the penetration device 110 is positioned in proximity to a skin 132 or fuselage of the vehicle 102. In a particular implementation, the skin 132 of the vehicle 102 corresponds to a nozzle of the vehicle 102 or of a rocket of the propulsion system 104.

In another implementation, the penetration device 110 is positioned in proximity to a primary load path of the vehicle 102 to induce breakup of the vehicle 102 or structure thereof. For example, the penetration device 110 is positioned in proximity to a location where support struts of the vehicle 102 attach to a structure of the vehicle 102. Severing the support struts from the structure can induce the vehicle 102 to break apart.

In another particular implementation, the penetration device 110 is positioned in proximity to a propellant feed line. In such implementations, the penetration device 110 severs the propellant feed line to stop the flow of liquid propellant to the propulsion system 104.

The penetration device 110 is capable of puncturing skin 132 and structure to terminate flight of the vehicle 102. The penetration device 110 may apply larger loads to a target to both puncture thicker components and create residual damage in thinner components, as compared to penetration devices that have flyer plates with uniform stiffness and thickness. Additionally or alternatively, the flyer plate 126 of the penetration device 110 alters the loading as compared to penetration devices that have flyer plates with uniform stiffness and thickness. For example, the flyer plate 126 having a recess may induce discontinuous loading. To illustrate, the load applied to the target is reduced at location (s) of the recess(es). This can lead to an abrupt shear radially prior to the recess(es), or cause discontinuous loading between cut-outs in a scalloped design. The reduction in load may be attributed to a reduction in stiffness, inertia (which at impact speeds may act as stiffness), and/or strength. Thus, the vehicle 102 is able to terminate flight more quickly with a flight termination system 2230 that has reduced weight and volume, as compared to vehicles that have penetration devices with uniform stiffness flyer plates, leading to heavier and larger penetration devices and vehicles. Accordingly, costs and complexity of the vehicle 102 are reduced due to the reduced weight, the reduced volume, a reduced number of penetration devices, or a combination thereof, as compared to vehicles that have penetration devices with uniform stiffness flyer plates, leading to vehicles having higher costs and complexity. Alternatively, the penetration device 110 is used in another type of structure, such as those described above.

Figure 2A:
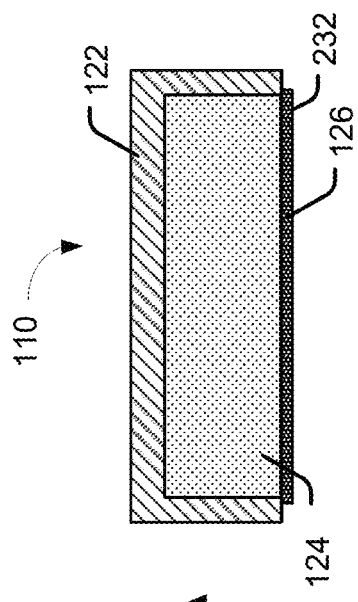
FIG. 2A is a diagram that illustrates a side view of an example of a penetration device having a flyer plate having a recess.
Figure 2B:
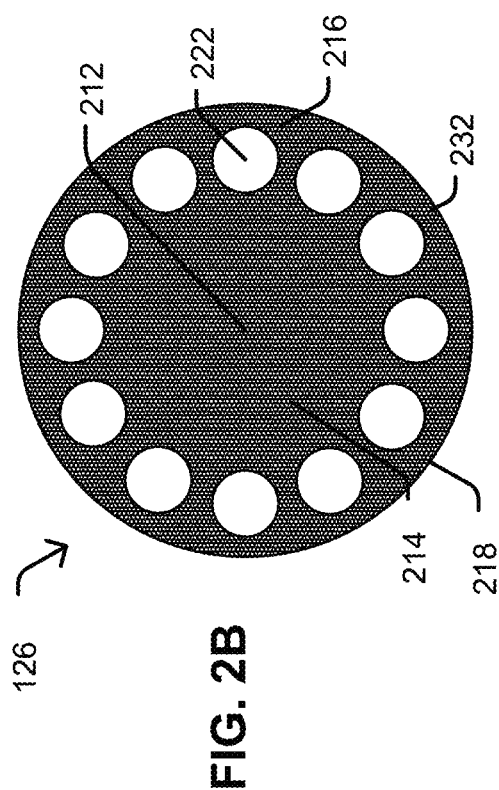
FIG. 2B is a diagram that illustrates a bottom view of the example of the flyer plate having a recess.
Figure 2C:
FIG. 2C is a diagram that illustrates a side view of the example of the flyer plate having a recess.
Figure 3A:
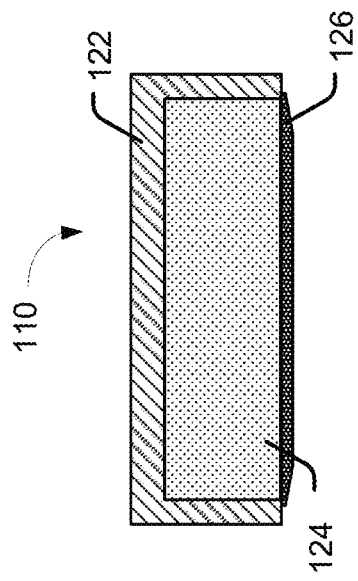
FIG. 3A is a diagram that illustrates a side view of an example of a penetration device having a variable thickness flyer plate.
Figure 3B:
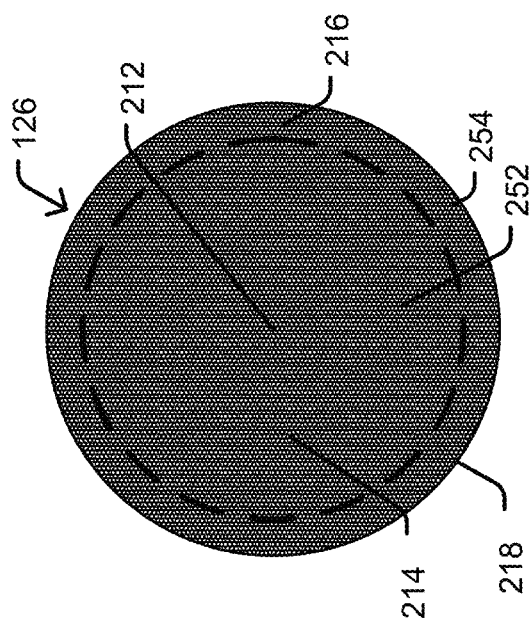
FIG. 3B is a diagram that illustrates a bottom view of the example of the variable thickness flyer plate.
Figure 3C:
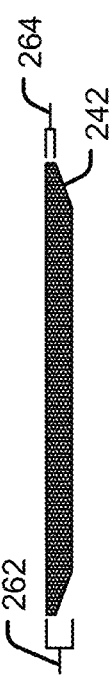
FIG. 3C is a diagram that illustrates a side view of the example of the variable thickness flyer plate.

FIGS. 2A-2C and 3A-3C are diagrams that illustrate examples of the penetration devices 110 and the flyer plate 126. FIGS. 2A-2C illustrate the penetration device 110 and the flyer plate 126 having a recess 222. FIGS. 3A-3C illustrate the penetration device 110 and the variable thickness flyer plate 126. Each of FIGS. 2A and 3A illustrate a side view of the penetration device 110. Each of FIGS. 2B and 3B illustrate a bottom view (illustrating a first surface 232) of the flyer plate having a plurality of recesses 222 and the variable thickness flyer plate 126, respectively. Each of FIGS. 2C and 3C illustrate a side view of the flyer plates 126.

Referring to FIG. 2A, an example of the penetration device 110 including the flyer plate 126 having a plurality of recesses 222 is illustrated. As illustrated in FIG. 2A, the first surface 232 of the flyer plate 126 faces away from the casing 122 and the propellant 124. In FIG. 2B, the flyer plate 126 having a recess 222 has multiple regions that have removed material, such as a plurality of recesses 222 (e.g., through holes, blind holes, counter bores, channels, etc.). As illustrated in FIG. 2B, the plurality of recesses 222 correspond to through-holes with circular cross sections. The flyer plate 126 includes the center portion 214 and the peripheral portion 216 defining the edge 218. The plurality of recesses 222 are positioned in the peripheral portion 216 and are patterned around a center 212 of the flyer plate 126. Additional examples of flyer plates 126 with removed material (e.g., one or more recesses 222) are described further with reference to FIGS. 7A-18C. FIG. 2C illustrates a side view of the flyer plate 126 and the flyer plate 126 has a substantially uniform thickness.

Referring to FIG. 3A, an example of the penetration device 110 including the variable thickness flyer plate 126 is illustrated. As illustrated in FIGS. 3B and 3C, the center portion 214 has a substantially constant first thickness 262 and the peripheral portion 216 is tapered from the first thickness 262 of the center portion 214 to a second thickness 264 at an edge 218. The center portion 214 has a first stiffness 252 and the peripheral portion 216 has a second stiffness 254 less than the first stiffness 252. FIG. 3C illustrates the peripheral portion 216 having a substantially constant taper, such as linear taper 242. Additional examples of variable thickness flyer plates 126 are described further with reference to FIGS. 21A-23R.

Although the casing 122 is illustrated in FIGS. 2A and 3A as having a larger diameter (wider as illustrated) than the flyer plates 126, in other implementations, the flyer plates 126 may be substantially the same size (e.g., the same diameter) as the casing 122 or may have a larger diameter than the casing 122.

FIGS. 4A-4C depict an example of deformation of a uniform thickness flyer plate 126 and the variable thickness flyer plate 126'. In FIGS. 4A-4C, the uniform thickness flyer plate 126 and the variable thickness flyer plate 126' are illustrated at various times from shortly after detonation to impact of the center portion 214 of the flyer plates 126, 126'. As illustrated in FIG. 4A, the casing 122 of the penetration device 110 is coupled to a stand-off 314. The stand-off 314 may include or correspond to a mount, a frame, or a support structure of the vehicle, such as the vehicle 102 of FIG. 1. A flyer plate 126 (e.g., the uniform thickness flyer plate 126 or the variable thickness flyer plate 126') of the penetration device 110 faces a target 312 and is positioned a stand-off distance 316 away from the target 312. In a particular example, the target 312 includes or corresponds the skin 132 and one or more supports 134 of the plurality of supports 134 of FIG. 1.

At a first time (T1), illustrated in FIG. 4A, the center portion 214 of the variable thickness flyer plate 126' starts to deform. A peripheral portion 216 of the variable thickness flyer plate 126' is accelerated to a greater extent than the peripheral portion 216 of the uniform thickness flyer plate 126 and is closer to the target 312. The peripheral portion 216 of the variable thickness flyer plate 126' is propelled further (downwards, as illustrated in FIG. 4A) because of the reduced stiffness (or increased flexibility) of the peripheral portion 216 of the variable thickness flyer plate 126' and because of the reduced inertia (e.g., mass).

At a second time (T2), illustrated in FIG. 4B, the center portion 214 and the peripheral portion 216 of the uniform thickness flyer plate 126 and the variable thickness flyer plate 126' continue to diverge. At a third time (T3), illustrated in FIG. 4C, the center portion of the uniform thickness flyer plate 126 and of the variable thickness flyer plate 126' impact the target 312. The center portion 214 of the uniform thickness flyer plate 126 strikes the target 312, and the peripheral portion 216 of the uniform thickness flyer plate 126 lags behind the deformed center portion 214 of the uniform thickness flyer plate 126. The center portion 214 and the peripheral portion 216 (or a sub-portion thereof) of the variable thickness flyer plate 126' strike the target 312. The loads applied to target 312 and the results of such impacts on the target 312 are described further with reference to FIGS. 7A-7C and 8A-8C.

FIGS. 5A and 5B illustrate impact results of uniform thickness flyer plate 126 and the variable thickness flyer plate 126' impacting the target 312, illustrated as the skin 132 and the supports 134 of FIG. 1. FIG. 5A illustrates an impact result of the uniform thickness flyer plate 126 puncturing a clean hole in the skin 132 and completely severing the one or more supports 134. FIG. 5B illustrates an impact result of the variable thickness flyer plate 126' puncturing a hole in the skin 132, completely severing the supports 134, and further causing structure damage (e.g., bending, shearing, deforming) to the skin 132. The variable thickness flyer plate 126' "continuously" loads the target and the load decreases toward the peripheral edge of the variable thickness flyer plate 126' to induce bending (e.g., adjacent loading) rather than direct shear. The induced bending is produced by the reduction in stiffness, a reduction in inertia (which can act as stiffness at impact speed), or both.

Figure 6:
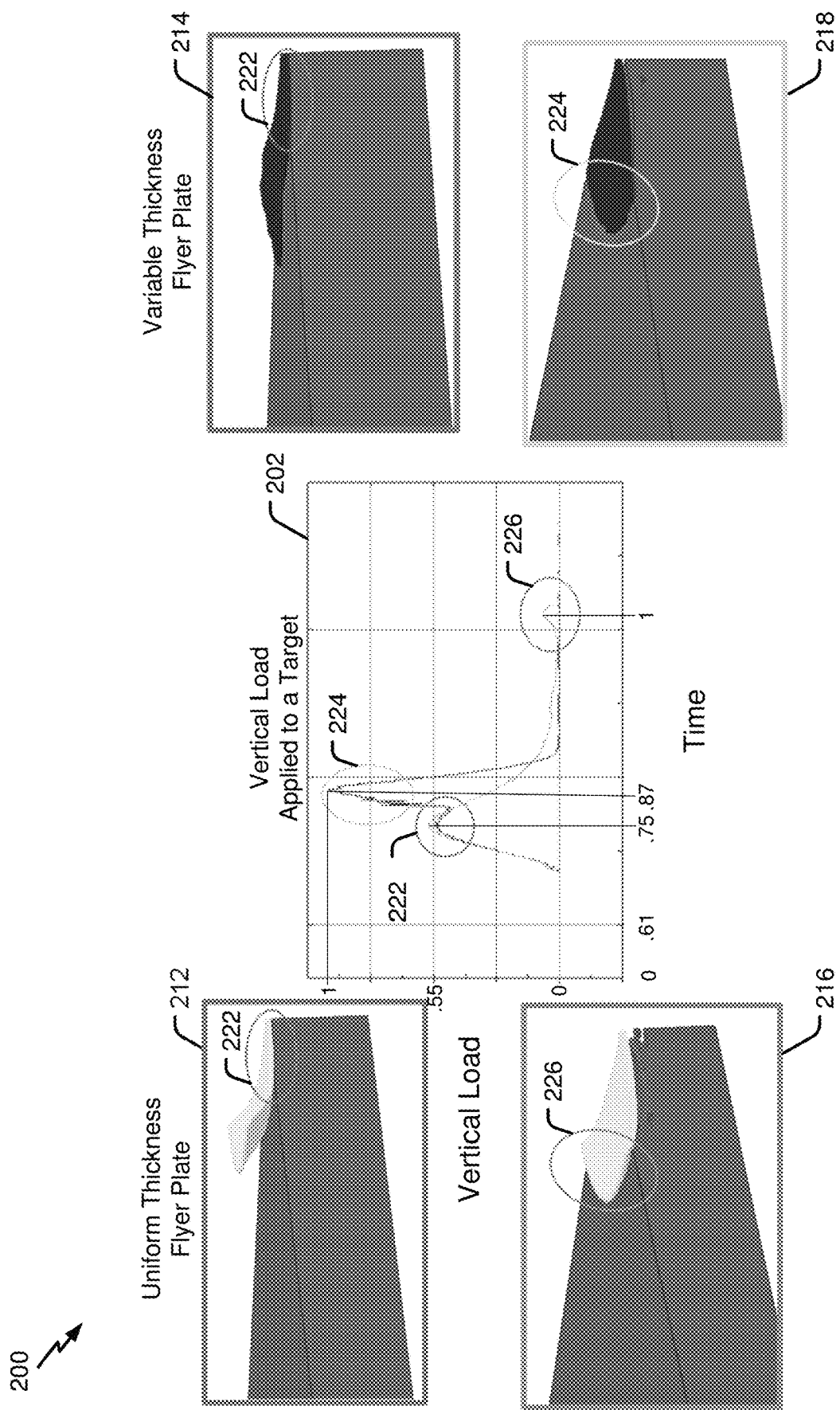
FIG. 6 is a diagram that illustrates an example of forces generated by flyer plates.

FIG. 6 depicts a diagram 400 that illustrates example of loads applied by flyer plates 126 to a target, such as the target 312 of FIG. 4A. In FIG. 6, examples of a vertical load applied by the flyer plates 126 over time and timing of impact of the center portion 214 and the peripheral portion 216 of the uniform thickness flyer plate 126 and the variable thickness flyer plate 126' of FIGS. 4A-4C are depicted.

A load diagram 402 illustrates vertical load applied by the uniform thickness flyer plate 126 and the variable thickness flyer plate 126' in plotted over time. The load diagram 402 includes normalized vertical load and time values. Corresponding impact diagrams 412-418 are illustrated for the uniform thickness flyer plate 126 and the variable thickness flyer plate 126 in FIG. 6. The impact diagrams 412-418 represent one quarter of the impact scenario for the uniform thickness flyer plate 126 and the variable thickness flyer plate 126. For example, each impact diagram, illustrates a view of a particular quarter (e.g., a 90 degree portion) of the flyer plate impacting a particular quarter of the target.

The impact diagrams 412 and 416 correspond to the uniform thickness flyer plate 126 and the impact diagrams 414 and 418 correspond to the variable thickness flyer plate 126'. Impact diagram 412 illustrates the center portion 214 of the uniform thickness flyer plate 126 striking the target and the peripheral portion 216 of the uniform thickness flyer plate 126 lagging behind. Impact diagram 416 illustrates the peripheral portion 216 of the uniform thickness flyer plate 126 striking the target after a delay. Impact diagram 414 illustrates the center portion 214 of the variable thickness flyer plate 126' striking the target and the peripheral portion 216 relatively close behind. Impact diagram 418 illustrates the peripheral portion 216 of the variable thickness flyer plate 126' striking the target shortly after the center portion 214 as compared to the uniform thickness flyer plate 126.

As illustrated in the impact diagrams 412-418, the peripheral portion 216 of the uniform thickness flyer plate 126 strikes the target significantly after the center portion 214 strikes the target, while the peripheral portion 216 of the variable thickness flyer plate 126' strikes the target shortly after the center portion 214 strikes the target. This reduction in time (from significantly after to shortly after) enables the peripheral portion 216 of the variable thickness flyer plate 126' to strike the target while the center portion 214 is applying a vertical load to the target, as illustrated in the load diagram 402. As compared to the peripheral portion 216 of the uniform thickness flyer plate 126, the peripheral portion 216 of the variable thickness flyer plate 126' strikes the target after the center portion 214 strikes the target in roughly half the time. Additionally, as illustrated in the load diagram 402, the variable thickness flyer plate 126' applies a higher maximum vertical load and applies a greater total impulse (e.g., the area under the curve). The higher maximum vertical load is generated by the center portion 214 and the peripheral portion 216 of the variable thickness flyer plate 126' striking the target closer in time (e.g., within a threshold period of time), as compared to uniform thickness flyer plate 126, and by the increased speed and flexibility (or reduced stiffness and inertia) of the peripheral portion 216 of the variable thickness flyer plate 126', as compared to uniform thickness flyer plate 126. The peripheral portion 216 striking the target within the threshold period of time (e.g., while the center portion 214 is applying a load to the target) enables the peripheral portion 216 to apply a vertical load to the target while the center portion 214 is applying a vertical load to the target.

Figure 7A:
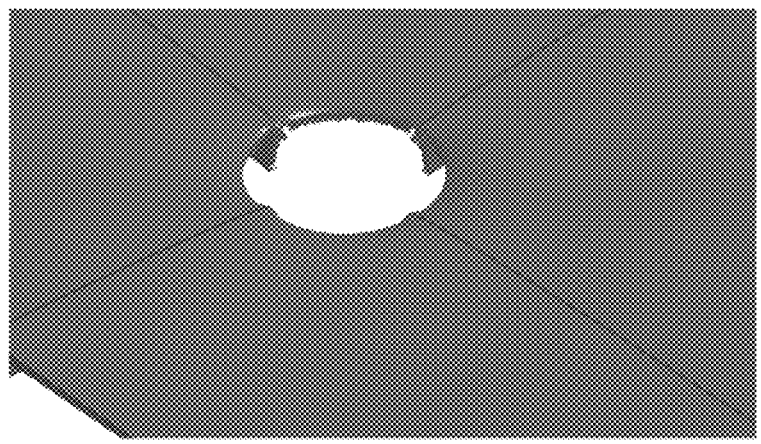
FIG. 7A is a diagram that illustrates damage caused by a uniform thickness flyer plate.
Figure 7B:
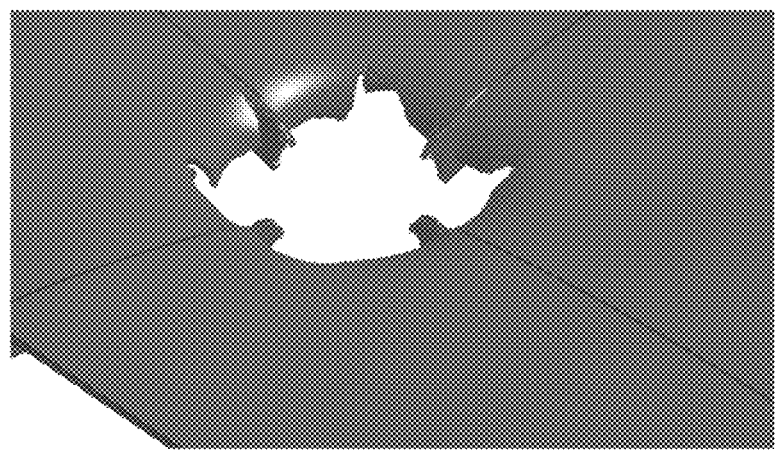
FIG. 7B is a diagram that illustrates damage caused by an example of a flyer plate having a plurality of recesses.
Figure 7C:
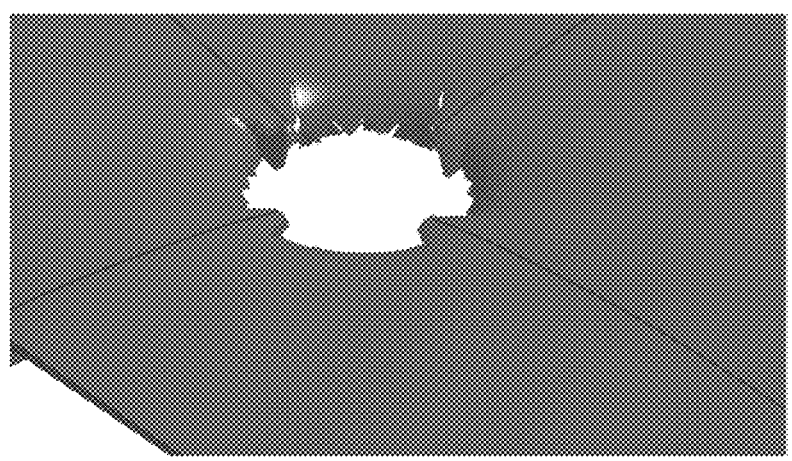
FIG. 7C is a diagram that illustrates damage caused by an example of a flyer plate having scallops.

FIGS. 7A-7C are diagrams that illustrate examples of holes created by flyer plates 126 having different shapes. In FIGS. 7A-7C, impact results for three different shapes or styles of flyer plates 126 impacting the skin 132 and a particular interconnect 136 of two supports 134 of the plurality of supports 134 are depicted. FIG. 7A illustrates an impact result of the uniform thickness flyer plate 126 (e.g., uniform or constant stiffness flyer plate) puncturing a clean hole in the skin 132 and completely severing the one or more supports 134. FIG. 7B illustrates an impact result of the flyer plate 126 having a recess 222 puncturing a hole in the skin 132, completely severing the supports 134, and further causing additional peripheral damage (e.g., bending, shearing, deforming, rupturing, cracking, etc.) to the skin 132. FIG. 7C illustrates an impact result of a flyer plate 126 having scallops in the peripheral portion or edge of the flyer plate 126, such as the peripheral portion 216 or the edge 218 of FIG. 2A. The scalloped flyer plate 126 punctures a hole in the skin 132, completely severs the supports 134, and further causes additional peripheral damage (e.g., bending, shearing, deforming) to the skin 132, similar to the flyer plate 126 having a recess 222.

Causing additional structural damage (e.g., bending, shearing, deforming, rupturing, etc., in the area around the hole) and applying higher loads (including adjacent loads)

increases an effectiveness of a penetration device. For example, the penetration device 110 of FIG. 1, including the flyer plate 126 having a recess 222 or the variable thickness flyer plate 126, is more effective than a penetration device 110 including the uniform thickness flyer plate 126. To illustrate, the flyer plate 126 having a recess 222 or the variable thickness flyer plate 126 may generate a hole larger in size than a diameter of the flyer plate 126 having a recess 222 or the variable thickness flyer plate 126. The increase in area of the structural damage increases an effectiveness in causing breakup of the target.

Figure 8A:
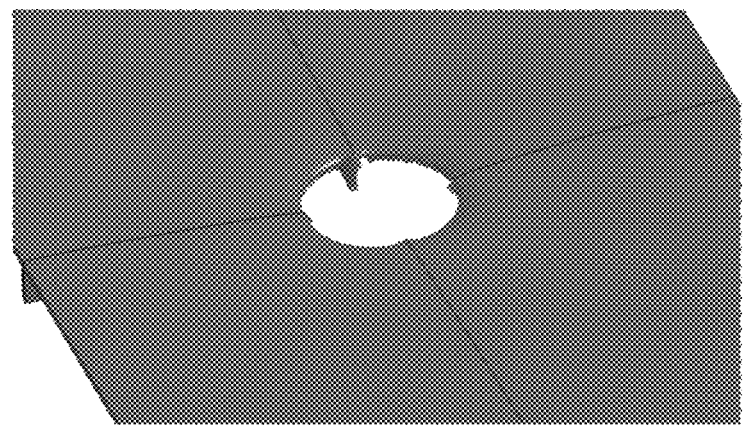
FIG. 8A is a diagram that illustrates damage caused by an example of a steel flyer plate.
Figure 8B:
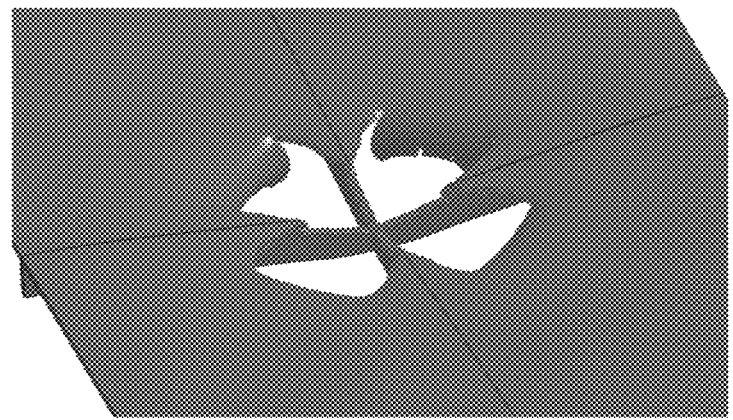
FIG. 8B is a diagram that illustrates damage caused by an example of an aluminum flyer plate.
Figure 8C:
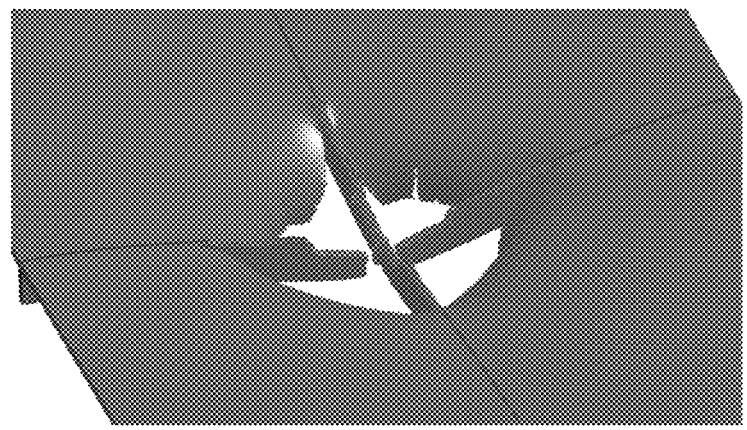
FIG. 8C is a diagram that illustrates damage caused by an example of a copper flyer plate.

FIGS. 8A-8C are diagrams that illustrate examples of holes created by flyer plates 126 having uniform thickness and different materials with different densities. As an illustrative, non-limiting example, the target is made of aluminum in FIGS. 8A-8C. In FIGS. 8A-8C, impact results for the flyer plate 126 having three different materials (each having different strengths and densities) impacting the skin 132 and the supports 134 are illustrated. FIG. 8A illustrates an impact result for the flyer plate 126 (e.g., a uniform or constant thickness flyer plate) made of steel. The steel flyer plate 126 punctures a clean hole in the skin 132 and completely severs the supports 134 from each other (e.g., from an interconnection of supports, such the interconnect 136 of FIG. 1). FIG. 8B illustrates an impact result for the flyer plate 126 made of aluminum. The aluminum flyer plate 126 generates multiple holes in the skin 132 and causes structure damage (e.g., bending, shearing, or deforming) to the skin 132 and the one or more supports 134. The flyer plate 126 made of aluminum did not sever the supports 134. FIG. 8C illustrates an impact result of the flyer plate 126 made of copper. The copper flyer plate 126 generates multiple holes in the skin 132 and causes structure damage to the skin 132 and the one or more supports 134. The copper flyer plate 126 severed one support from an interconnection of supports and did not sever each of the supports 134 from the interconnection, such as the interconnect 136 of FIG. 1.

More complaint and less dense materials cause more peripheral damage and less penetration than less compliant and denser materials. For example, the aluminum and copper flyer plates 126 caused more peripheral damage and less penetration than the steel flyer plate 126 in FIGS. 8A-8C. The uniform thickness and stiffness aluminum and copper flyer plates 126 were not able to cause sufficient penetration and peripheral damage. Varying the stiffness of the flyer plate 126 causes sufficient penetration and peripheral damage, as show in FIGS. 7B and 7C. Additionally, flyer plates 126 may include multiple materials, as described with reference to FIGS. 11A-18C to achieve sufficient penetration and peripheral damage with a uniform or substantially uniform thickness.

FIGS. 9A-9F illustrate examples of variable stiffness flyer plates 126 with portions of material removed, such as the flyer plate 126 of FIG. 1. In FIGS. 9A-9F, the portions of material removed correspond to recesses 222 in the peripheral portion 216 of the flyer plate 126 as described with reference to FIGS. 2A-2C. FIGS. 9A-9F illustrate bottom views of the flyer plates 126, depicting the first surface 232 of the flyer plate 126 that faces a target, such as the target 312 of FIG. 4A. In FIGS. 9A-9F, each of the recesses 222 is a through hole 702. In other implementations, the recesses 222 include or correspond to blind holes, cavities, or channels, such as described with reference to FIGS. 9A and 18C.

Figure 9A:
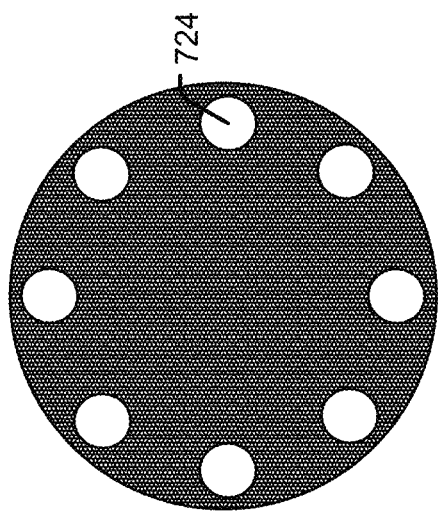
FIGS. 9A, 9B, 9C, 9D, 9E, and 9F are each a diagram that illustrates an example of a flyer plate having a plurality of through holes.

Referring to FIG. 9A, a first example of the flyer plate 126 is illustrated. The flyer plate 126 includes a plurality of holes 722 (through holes 702) arranged around the center 212 of the flyer plate 126 in a pattern 720. For example, each hole of the plurality of holes 722 is substantially the same size and substantially evenly spaced around the center 212 of the flyer plate 126. As illustrated in FIG. 9A, the holes 722 are arranged in a radial pattern 720 (e.g., evenly spaced around the center 212 and having the same distance or radius from the center 212). The holes 722 have radial symmetry (e.g., symmetry with respect to a radial line). As illustrated in FIGS. 9A-9F, the plurality of holes 722 are disposed in the peripheral portion 216 of the flyer plate 126. In other implementations, one or more holes of the plurality of holes are disposed in the second peripheral portion 1216, as described with reference to FIG. 23A-23R.

Figure 9B:
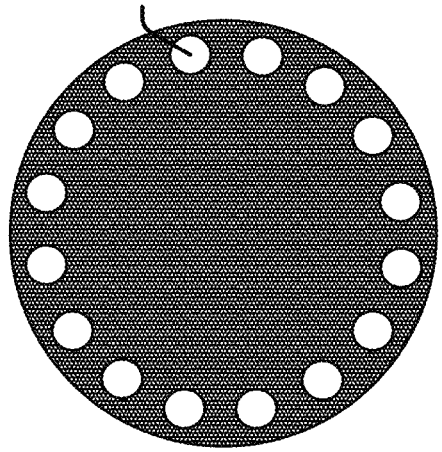
Figure 9C:
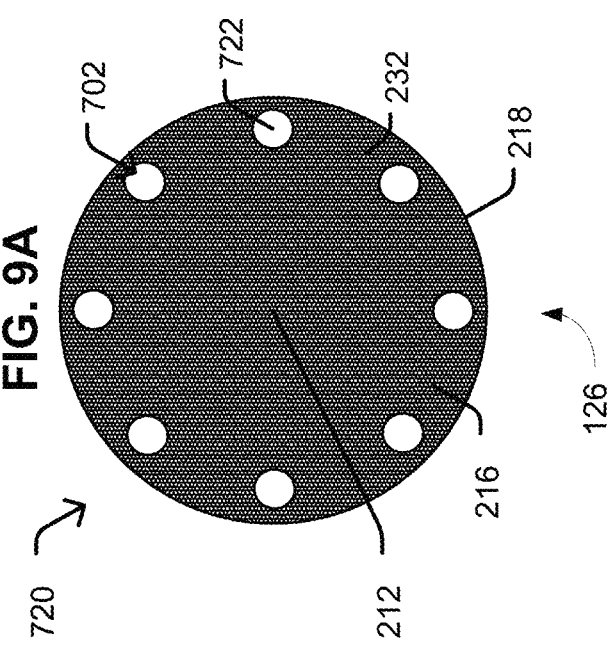
Figure 9D:
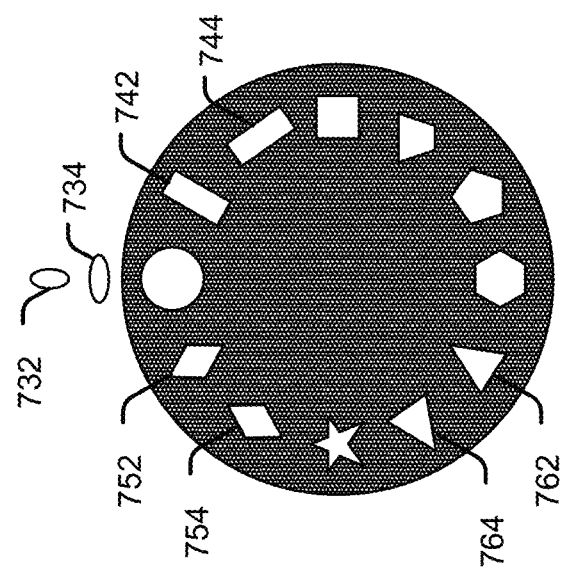

FIGS. 9B-9D also includes a plurality of holes 722-726, each arranged in a different pattern 720 as compared to FIG. 9A. The pattern 720 of FIG. 9B has a greater number of holes 722 as compared to the pattern 720 of FIG. 9A. The pattern 720 of FIG. 9C has a plurality of holes 724, and a size (diameter) of the holes 724 is larger than a size of the holes 722 of FIGS. 9A and 9B.

Figure 9E:
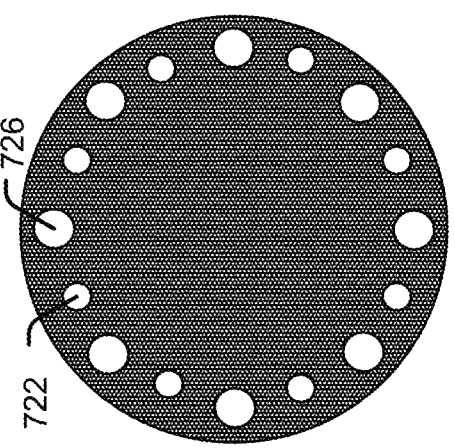

FIGS. 9D and 9E illustrate flyer plates 126 that each have multiple different sized holes. FIG. 9D has relatively larger holes, the holes 722, and relatively, smaller holes, holes 726. As illustrated in FIG. 9D, the holes 722 are arranged in a radial pattern (e.g., evenly spaced around the center and having the same distance or radius from the center 212). The holes 722 have radial symmetry (e.g., symmetry with respect to a radial line). The holes 726 are also aligned in a radial pattern 720 and are radially aligned with the holes 722. To illustrate, a line or radius from the center 212 passes through a center of corresponding holes 722 and 726. Although the smaller holes 726 of the pattern 720 of FIG. 9D are illustrated as having the same pattern 720 as the larger holes 722, the smaller holes 726 may have a different pattern 720 and may be offset from the larger holes 722. Additionally or alternatively, a number of the larger holes 722 may be greater than or less than the number of the smaller holes 726. In FIG. 9D, the holes 726 may be in the peripheral portion 216 and the holes 722 may be in the second peripheral portion 1216.

FIG. 9E illustrates that the two different size holes 722 and 726 are arranged in a radial pattern 720 and are circumferentially aligned with respect to one another around the center 212 of the flyer plate 126. To illustrate, centers of the holes 722 and 726 are arranged and aligned around a circumference of a circle about the center 212, and each of the centers of the holes 722 and 726 has the same distance (radius) from the center 212.

Figure 9F:
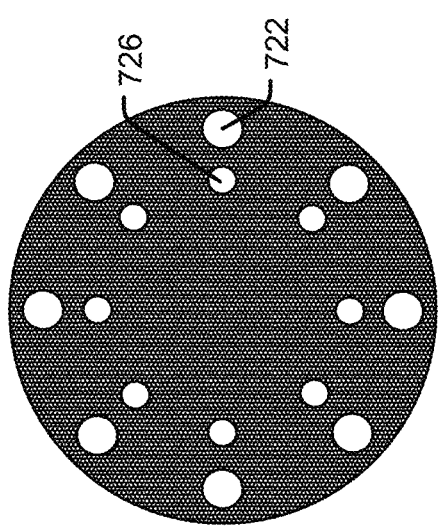

Although the plurality of holes 722-726 are illustrated in FIGS. 9A-9F as having a circular cross section, in other implementations one or more holes have a different shape of cross section, such as one of the cross section shapes illustrated in FIG. 9F. FIG. 9F illustrates various different shapes of cross sections of holes 722-726, such as circles, ellipses, rectangles, squares, trapezoids, pentagons, hexagons, triangles, stars, diamonds or other shapes. A first ellipse 732 and a second ellipse 734 are illustrated as exemplary shapes and are not illustrated as holes in the flyer plate 126 of FIG. 9F.

Each of the shapes may be oriented radially, circumferentially, with respect to a particular axis, or independent of one another. For example, a first ellipse 732, a first rectangle 742, and a first diamond 752 are oriented radially (e.g., oriented along a radius). To illustrate, a major axis of the first ellipse 732 is pointed along a radius of a circle having the center 212. When oriented radially, the shape may be oriented inwards or outwards relative to the center 212. To illustrate, a first triangle 762 is pointed inwards and a second triangle 764 is pointed outwards. As another example, second ellipse 734, a second rectangle 744, and a second diamond 754 are oriented circumferentially (e.g., oriented along a circumference). To illustrate, a major axis of the second ellipse 734 is pointed along a circumference of a circle having the center 212. Although the recesses 222 are illustrated as through holes 702 in FIG. 9A-9F, in other implementations one or more of the recesses 222 are blind holes, as described further in FIG. 11B.

FIGS. 10A-10C illustrates additional examples of variable stiffness flyer plates with one or more recesses 222, such as the flyer plate 126 of FIG. 1. In FIGS. 10A-10C, the one or more recesses 222 are positioned in or near the edge 218 (e.g., the peripheral edge) of the peripheral portion 216. FIGS. 10A-10C illustrate bottom views of the flyer plates 126, depicting the first surface 232 of each flyer plate 126 that faces a target, such as the target 312 of FIG. 4A. In FIGS. 10A-10C, each of the recesses 222 is a through hole 702. In other implementations, the recesses 222 in the peripheral edge 218 include or correspond to blind holes, cavities, or channels, such as described with reference to FIG. 11B.

FIG. 10A illustrates a plurality of notches 802 in the edge 218 of the peripheral portion 216 of the flyer plate 126. The plurality of notches 802 are arranged around the center 212 of the flyer plate 126 in a pattern 720. In some implementations, the pattern 720 includes a radially symmetrically pattern. To illustrate, each of the features (the notches 802 in FIG. 10A) of the pattern 720 is equally spaced from each other feature around the edge 218 of the flyer plate 126. The plurality of notches 802 may include one or more types of notches 802, such as notch types 812-816. A first type 812 of notch 802 includes sidewalls with substantially parallel lines. A second type 814 of notch 802 and a third type 816 of notch 802 include angled sidewalls. The sidewalls of the second type 814 of notch 802 are angled such that the second type 814 of notch 802 is wider near the center 212 of the flyer plate 126. The sidewalls of the third type 816 of notch 802 are angled such that the third type 816 of notch 802 is wider at the edge 218 of the flyer plate 126. In a particular implementation, the sidewalls may be aligned (e.g., radially aligned) with the center 212 of the flyer plate 126.

FIG. 10B illustrates a plurality of teeth 804 in the edge 218 of the peripheral portion 216 of the flyer plate 126. The plurality of teeth 804 are arranged around the center 212 of the flyer plate 126. The plurality of teeth 804 may include one or more types of teeth 804. The types of teeth 804 may include or correspond the types 812-816 of notches 802, such as parallel, angled outward, and angled inward.

FIG. 10C illustrates a plurality of scallops 806 in the edge of the peripheral portion 216 of the flyer plate 126. The plurality of scallops 806 are arranged around the center 212 of the flyer plate 126. The plurality of scallops 806 may include one or more types of scallops 806. The types of scallops 806 may include or correspond to a portion of a conical section, such a portion of a circle, an ellipse, a parabola, or a hyperbole.

In other implementations, flyer plates 126 may include a greater or lesser number of recesses 222 or features (e.g., notches 802, teeth 804, or scallops 806). Additionally, the recesses 222 or features may have different sizes. For example, a first tooth 804A may have a first dimension 862 (e.g., length, width, or area) that is greater than a second dimension 864 of a second tooth 804B. In a particular implementations, the recesses 222 may include one more first type recesses 222 and one or more second type recesses 222. The recesses 222 may be arranged symmetrically around the center 212 in the pattern 720 or asymmetrically.

Figure 11A:
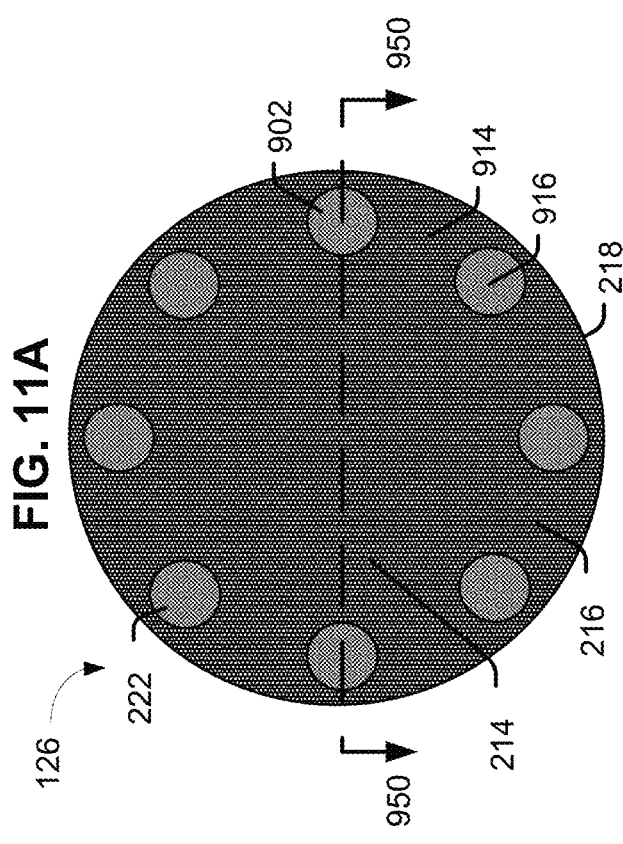
FIG. 11A is a diagram that illustrates a bottom view of an example of a flyer plate having a plurality of partial recesses.
Figure 11B:
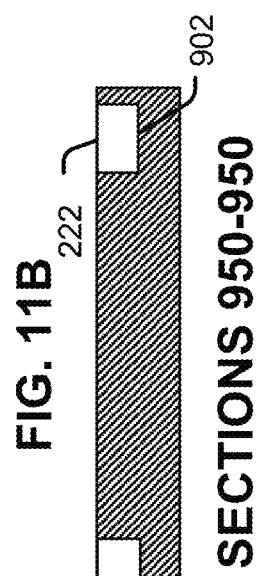
FIG. 11B is a diagram that illustrates a cross section of a first example of the flyer plate having a plurality of partial recesses in FIG. 11A.
Figure 11C:
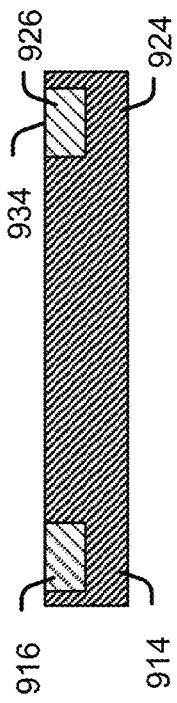
FIG. 11C is a diagram that illustrates a cross section of a second example of the flyer plate having a plurality of partial recesses in FIG. 11A.

FIGS. 11A-11C illustrate examples of flyer plates having a recess 222. FIG. 11A is a diagram that illustrates a bottom view of an example of a flyer plate having a plurality of recesses 222. FIG. 11B is a diagram that illustrates a cross sectional view of a first example of the flyer plate of FIG. 11A across axis 950. FIG. 11C is a diagram that illustrates a cross sectional view of a second example of the flyer plate of FIG. 11A across the axis 950.

Referring to FIG. 11A, the flyer plate 126 including a plurality of recesses 222 is depicted. In FIG. 11A, each of the recesses 222 is a blind hole. In some implementations, the recesses 222 may be filled (to form a substantially flat surface) with a second material 916 having a second density 926 different (e.g., greater) than a first density 924 of a first material 914 of the center portion 214 and the peripheral portion 216. As illustrated in FIG. 11C, each of the recesses 222 is filled with the second material 916. In other implementations, the recesses 222 are not filled and the flyer plate 126 has variable thickness in the peripheral portion 216, as shown in as shown in FIG. 11A.

FIG. 11B illustrates an unfilled recess 222 in the first material 914, while the FIG. 11C illustrates a filled-in recess 934, such as the recess 222 filled with the second material 916. FIG. 11B corresponds to an example of the flyer plate 126 having a recess 222. FIG. 11C corresponds to an example of the flyer plate 126 having a recess 222 and to an example of the variable density flyer plate 126.

Figure 12:
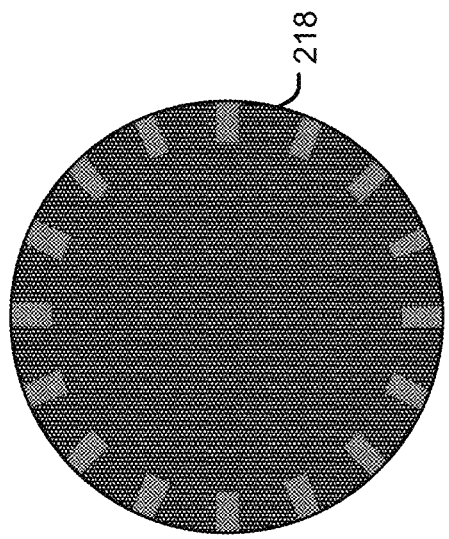
FIG. 12 is a diagram that illustrates an example of a flyer plate having a plurality of partial recesses in the form of notches.
Figure 14:
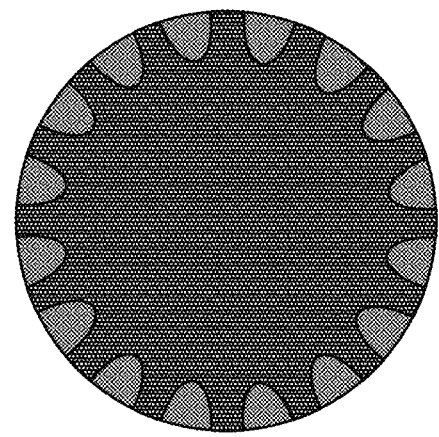
FIG. 14 is a diagram that illustrates an example of a flyer plate having a plurality of partial recesses in the form of scallops.
Figure 13:
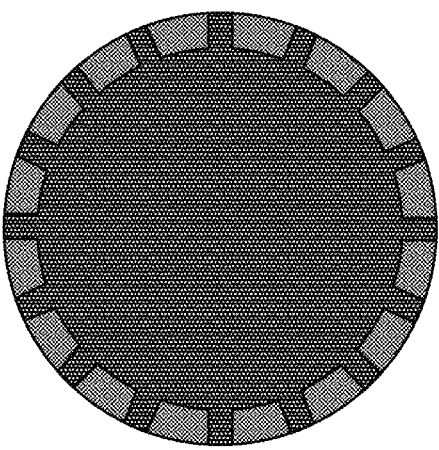
FIG. 13 is a diagram that illustrates an example of a flyer plate having a plurality of partial recesses in the form of teeth.

FIGS. 12-14 illustrate additional examples of flyer plates 126 with multiple regions of the edge 218 (the peripheral edge) of the peripheral portion 216 removed to form the recesses 222. In FIG. 11, the recesses 222 correspond to notches, such as the notches 802 described with reference to FIG. 10A. In FIG. 12, the recesses 222 corresponds to teeth, such as the teeth 804 described with reference to FIG. 10B. In FIG. 14, the recesses 222 corresponds to scallops, such as the scallops 806 described with reference to FIG. 10C.

Figure 15B:
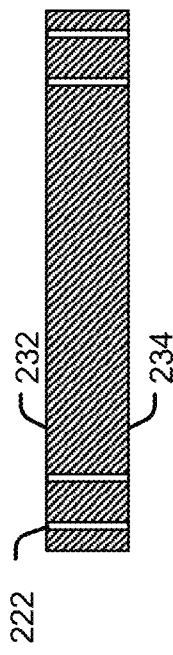
FIGS. 15B and 15C are each a diagram that illustrates a cross section of an example of the variable stiffness flyer plate having recesses in the form of concentric channels.
Figure 15C:
Figure 15A:
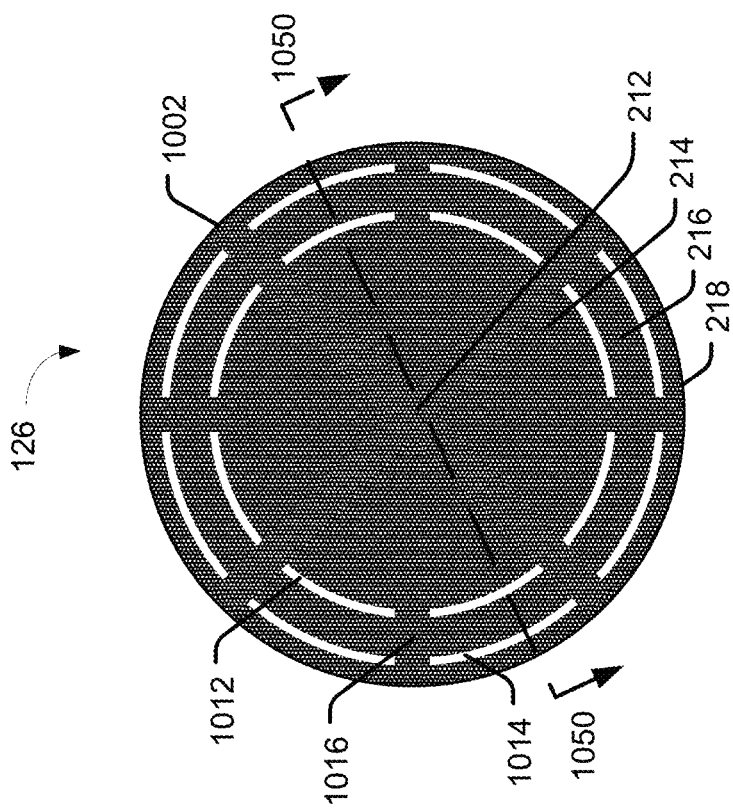
FIG. 15A is a diagram that illustrates an example of a variable stiffness flyer plate having recesses in the form of concentric channels.

FIGS. 15A-15C illustrate examples of flyer plates 126 having a recess 222. FIG. 15A is a diagram that illustrates a bottom view of an example of a flyer plate having recesses 222 in the form of concentric channels 1012, 1014. FIG. 15B is a diagram that illustrates a cross sectional view of a first example of the flyer plate 126 of FIG. 15A across axis 1050. FIG. 15C is a diagram that illustrates a cross sectional view of a second example of the flyer plate 126 of FIG. 15A across the axis 1050.

Referring to FIG. 15A, the flyer plate 126 has material removed from multiple regions of the peripheral portion 216 to form recesses 222 that have a concentric arrangement or pattern and the recesses 222 of the multiple regions include or correspond to one or more concentric channels, such as the concentric channels 1012 and 1014. To illustrate, the recesses 222 form one or more concentric channels or rings about the center 212. In some of the examples, a second material having a different density (e.g., a lower density), such as the second material 916 of FIG. 11C, may be formed or deposited in the concentric channels 1012 and 1014 formed in a first material, such as the first material 914 of FIG. 11C, as described further with reference to FIGS. 16A-18C. As illustrated in FIGS. 15A-15C, each of the concentric channels 1012 and 1014 is not filled with the second material for clarity.

In FIG. 15A, the flyer plate 126 includes the concentric channels 1012 and 1014 and the concentric channels 1012 and 1014 are through holes, such as the through holes 702. In other implementations, such as in FIG. 15C, the concentric channels 1012 and 1014 are blind holes, such as the blind holes 902. The concentric channels 1012 and 1014 are separated from each other by radial supports 1016 and are concentric to one another (e.g., the have the same center, the center 212). Although two channels (1012 and 1014) and eight radial supports 1016 are illustrated in FIG. 10, the flyer plate 126 may include greater or fewer channels and radial supports in other implementations.

Referring to FIGS. 15B and 15C, FIG. 15B illustrates an example of the flyer plate 126 where the concentric channels 1012 and 1014 are through holes 702, and FIG. 15C illustrates an example of the flyer plate 126 where the concentric channels 1012 and 1014 are blind holes 902. Although FIG. 15C illustrates the concentric channels 1012 and 1014 having a particular depth, in other implementations, the concentric channels 1012 and 1014 may be deeper or shallower than as illustrated in FIG. 15C.

FIGS. 16A-16E illustrate examples of flyer plates 126 having a recess 222. FIG. 16A is a diagram that illustrates a bottom view of an example of a flyer plate 126 having recesses 222 in the form of concentric channels 1012 and 1014. Each of FIGS. 16B-16E is a diagram that illustrates a cross sectional view of a respective example of the flyer plate 126 of FIG. 16A across axis 1150.

Referring to FIG. 16A, the flyer plate 126 includes concentric channels 1012 and 1014 that form recesses in the first material of the flyer plate 126. As illustrated in FIG. 16A, each of the concentric channels 1012 and 1014 of the flyer plate 126 is filled with the second material 916 for clarity. In some implementations, such as illustrated in FIGS. 16B, 16C, and 16D, the concentric channels 1012 and 1014 are not filled in. Such examples of flyer plates 126 may correspond to examples of the variable density flyer plate 126.

The concentric channels 1012 and 1014 may be formed in a first surface 232 (e.g., a surface that faces the casing and propellant), in a second surface 234 (e.g., a surface that faces away from the casing and the propellant), or in both. As illustrated in FIGS. 16A-16D, the concentric channels 1012 and 1014 are formed in the first surface 232 and have substantially the same size (e.g., substantially the same width and depth). FIG. 16C includes concentric channels 1012 and 1014 in both surfaces 232, 234.

In FIG. 16D, the concentric channels 1012 and 1014 are filled in with another material. For example, the concentric channels 1012 and 1014 are filled with the second material 916 having the second density 926 less than the first density 924 of the first material 914. As illustrated in FIG. 16D, the recesses 934 are filled (e.g., fully filled), such as with the second material 916 such that the flyer plate 126 has a substantially constant thickness. In other implementations, the recesses 934 are partially filled and the flyer plate 126 may not have a substantially constant thickness.

Although the concentric channels 1012 and 1014 in FIG. 16B-FIG. 16D are illustrated as having the same depth, in other implementations, the channels 1012 and 1014 may be deeper or shallower. As illustrated in FIG. 16E, a first channel (the concentric channel 1012) closer to the center 212 is smaller (has a smaller width and depth) as compared to a second channel (the concentric channel 1014) that is closer to the peripheral edge, such as the edge 218, of the flyer plate 126. Forming deeper channels 1012 and 1014 closer to the peripheral edge may reduce a stiffness of the flyer plate 126 to a greater extent than forming deeper channels 1012 and 1014 closer to the center 212 of the flyer plate 126.

Additionally or alternatively, the concentric channels 1012 and 1014 of FIGS. 16A-16E may have different shapes. For example, sidewalls of the concentric channels 1012 and 1014 may be parallel 1162, angled inwards 1164, angled outwards, or curved (e.g., concave 1166 or convex 1168), as illustrated in example sidewall diagram 1160 of FIG. 16B.

FIGS. 17A-17D illustrate examples of flyer plates 126 having a recess 222. FIG. 17A is a diagram that illustrates a bottom view of an example of a flyer plate having recesses in the form of concentric channels. Each of FIGS. 17B-17D is a diagram that illustrates a cross sectional view of a respective example of the flyer plate 126 of FIG. 17A across axis 1250. As compared to the concentric channels 1012 and 1014 of FIG. 16A, the concentric channels illustrated in FIG. 17A have different sizes. (e.g., a different width as illustrated in FIG. 17A).

As illustrated in FIG. 17A, each of the concentric channels 1012 and 1014 of the flyer plate 126 is filled with the second material 916 for clarity. In some implementations, such as illustrated in FIGS. 17B and 17C, the concentric channels 1012 and 1014 are not filled in. Such examples of flyer plates 126 may correspond to examples of the variable density flyer plate 126. Forming different sized channels 1012 and 1014 may cause the flyer plate 126 to cause a relatively higher level of discontinuous loading as compared to flyer plates 126 that have channels 1012 and 1014 of similar sizes.

Figure 18B:
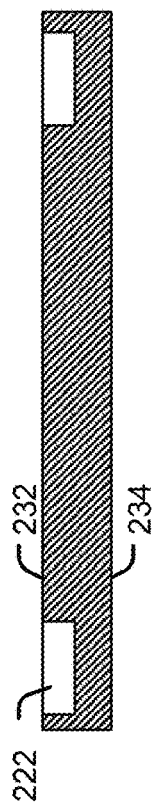
FIGS. 18B and 18C are each a diagram that illustrates a side view of an example of the variable stiffness flyer plate having multiple types of recesses.
Figure 18C:
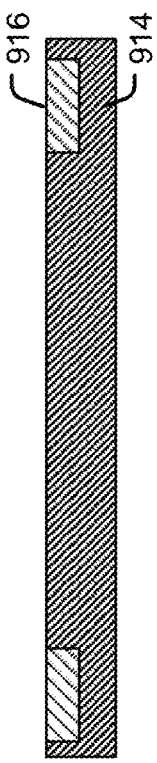
Figure 18A:
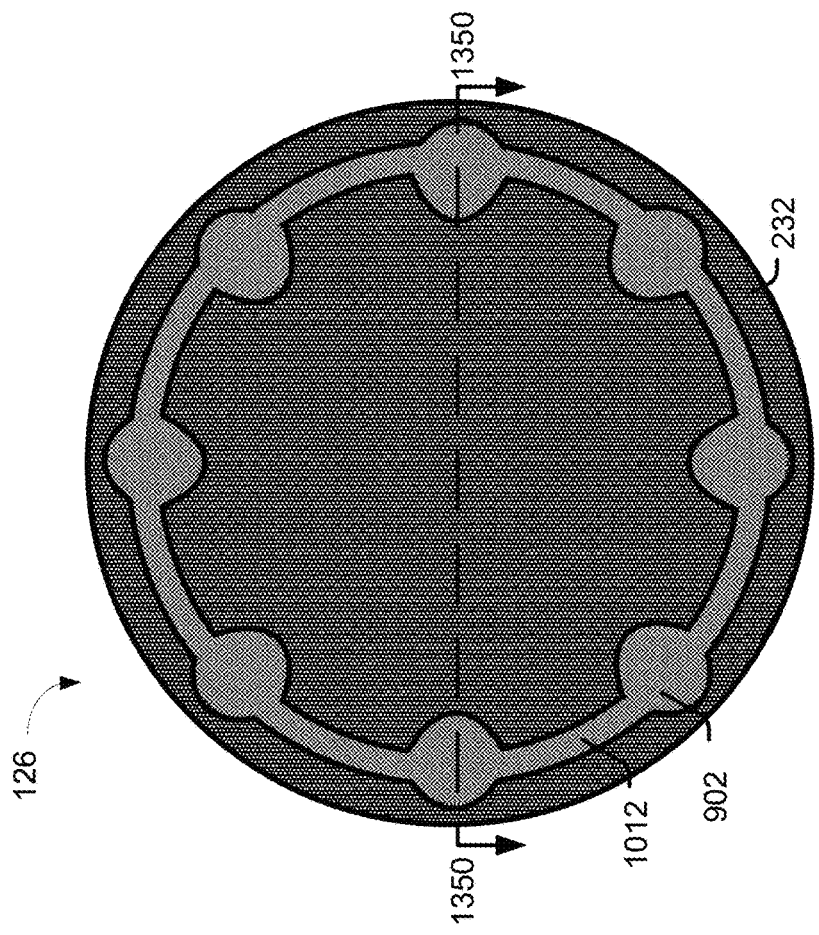
FIG. 18A is a diagram that illustrates a bottom view of an example of a variable stiffness flyer plate having multiple types of recesses.

FIGS. 18A-18C illustrate examples of flyer plates 126 having multiple types of recesses 222. FIG. 18A is a diagram that illustrates a bottom view of an example of a flyer plate 126 having a concentric channel 1012 and a plurality of blind holes 902. Each of FIGS. 18B and 18C is a diagram that illustrates a cross sectional view of a respective example of the flyer plate of FIG. 18A across axis 1350.

Referring to FIG. 18A, the flyer plate 126 includes recesses 222 that form a single concentric channel, the concentric channel 1012, and the plurality of blind holes 902. Although the plurality of blind holes 902 are connected to one another by the concentric channel 1012 as illustrated in FIG. 18A, in other implementations one or more of the plurality of blind holes 902 are separate from the concentric channel 1012. In other implementations, the flyer plate 126 includes a plurality of through holes 702, notches 802, teeth 804, or scallops 806, instead of the blind holes 902.

The recesses 222 of FIGS. 7A-18C may be formed by removing portions of material from a unitary flat flyer plate 126 by machining (e.g., counter-boring) or etching. Alternatively, the flyer plate 126 may be formed (e.g., cast, molded, or stamped) into a unitary structure that defines the recesses. The recesses 222 of FIGS. 7A-18C may have different thicknesses or depths than illustrated in FIGS. 7A-18C. For example, a ratio of a second thickness of the one or more recesses 222 to the first thickness of the center portion 214 may be within a range of 0.1 to 0.9. Having the ratio within the range of 0.1 to 0.9 varies the stiffness (strength, and/or inertia) of the flyer plate 126 from the center portion 214 to the peripheral portion 216 and reduces the impact delay between the center portion 214 and the peripheral portion 216 such that the flyer plate 126 penetrates a target and creates peripheral structural damage, as described with reference to FIGS. 4A-4C and 6.

FIGS. 19A-19F illustrate examples of variable density flyer plates 126 having a dense insert 1412. FIG. 19A is a diagram that illustrates a bottom view of an example of a variable density flyer plate 126 having a dense insert 1412. Each of FIGS. 19B-19F is a diagram that illustrates a cross sectional view of a respective example of the variable density flyer plate 126 having a dense insert 1412 of FIG. 19A across axis 1450.

Referring to FIG. 19A, the center portion 214 includes a first material 914 having the first density 924 greater than a second density 926 of a second material 916 of the peripheral portion 216. In some implementations, the center portion 214 is formed from the first material 914 and the peripheral portion 216 is formed around the center portion 214. In other implementations, the flyer plate 126 is formed from the second material 916, the center portion 214 (or a portion thereof) is removed, such as by machining, and the first material 914 is formed or deposited in a recess formed in the center portion 214. A thickness of the first material 914 may be the same as or less than a thickness of the flyer plate 126.

FIG. 19B illustrates a first thickness 262 of the first material 914 is substantially the same as a second thickness 264 of the flyer plate 126. FIG. 19C illustrates the first thickness 262 of the first material 914 is less than the second thickness 264 of the flyer plate 126, and FIG. 19D illustrates the first thickness 262 of the first material 914 is greater than the second thickness 264 of the flyer plate 126. In FIG. 19C, the first material 914 is recessed into the flyer plate 126 in the center portion 214 and the flyer plate 126 has a substantially constant thickness. While in FIG. 19D, a portion of the first material 914 protrudes from the flyer plate 126 in the center portion 214.

FIGS. 19E and 19F illustrate recesses 222, 934 in the peripheral portion 216 of the flyer plate 126. The recesses 222, 934 of FIGS. 19E and 19F may include or correspond to the recesses 222 described with reference to FIGS. 7A-18C. For example, the recesses 222 may include through holes 702, blind holes 902, notches 802, teeth 804, scallops 806, concentric channels 1012, 1014, or a combination thereof. In FIG. 19E, the recess 222 is on a second surface 234 opposite a first surface 232 that includes the first material 914 of the center portion 214, corresponding to the dense insert 1412. Although the first material 914 of the center portion 214 is illustrated as having a thickness less than the thickness of the flyer plate 126 in FIG. 19E, in other implementations, the first material 914 of the center portion 214 has the same thickness as the flyer plate 126. In FIG. 19F, the recess 934 is filled in and the peripheral portion 216 has substantially constant thickness. As illustrated in FIG. 19F, the recess 934 is filled with a third material 918 that has a third density 928 less than the first density 924 of the first material 914 and less than the second density 926 of the second material 916. In other implementations, the third density 928 of the third material 918 is greater than the first density 924, the second density 926, or both. Additionally or alternatively, the recesses 222, 934 of FIGS. 19E and 19F may be formed in the first surface 232. In some implementations, the first surface 232 faces a target, and in other implementations, the second surface 234 faces the target, such as the target 312 of FIG. 4A.

FIGS. 20A-20F illustrate examples of variable density flyer plates 126 having a plurality of supports 1514. FIG. 20A is a diagram that illustrates a bottom view of an example of a variable density flyer plate having a plurality of supports. Each of FIGS. 20B-20F is a diagram that illustrates a cross sectional view of a respective example of the variable density flyer plate having a plurality of supports of FIG. 20A.

Referring to FIG. 20A, the flyer plate 126 includes the center portion 214 and multiple regions of the peripheral portion 216 include supports 1514 (e.g., stiffeners) configured increase a stiffness of the center portion 214. The supports 1514 may include the first material 914 or the second material 916. As illustrated in FIG. 20A, the supports include the first material 914. The supports 1514 may include or form a circular portion or base, as illustrated in FIG. 20A.

FIG. 20B illustrates a third thickness 266 of the supports 1514 in the center portion 214 is substantially the same as a fourth thickness 268 of the supports 1514 in the multiple regions of the peripheral portion 216. FIGS. 20C and 20D illustrate that the third thickness 266 of the supports 1514 in the center portion 214 is greater than the fourth thickness 268 of the supports 1514 in the multiple regions of the peripheral portion 216. In FIG. 20C, a portion of the supports 1514 is recessed into the flyer plate 126 in the center portion 214 and the flyer plate 126 has a substantially constant thickness. In FIG. 20D, a portion of the supports 1514 protrudes from the flyer plate 126 in the center portion 214.

FIGS. 20E and 20F illustrate recesses 222, 934 in the peripheral portion 216 of the flyer plate 126. In FIG. 20E, the recess 222 is formed in the second surface 234 opposite the first surface 232 that includes the plurality of supports 1514. Although the first material 914 of the center portion 214 is illustrated as having a thickness less than the thickness of the flyer plate 126 in FIG. 20E, in other implementations the first material 914 of the center portion 214 has the same thickness as the flyer plate 126. In FIG. 20E, the recess 934 is filled in and the peripheral portion has a substantially uniform thickness. As illustrated in FIG. 20F, the recess 934 is filled with a third material 918 that has a third density 928 less than the first density 924 of the first material 914 and less than the second density 926 of the second material 916. In other implementations, the third density 928 is greater than the first density 924, the second density 926, or both. Additionally or alternatively, the recesses 222, 934 of FIGS. 20E and 20F may be on the first surface 232.

FIGS. 19E, 19F, 20E and 20F correspond to examples of the flyer plate 126 having a recess 222 and to examples of the variable density flyer plate 126. FIGS. 19B-19D, 20B-20D correspond to examples of the variable density flyer plate 126. Additionally, some of the flyer plates of FIGS. 19A-20F have substantially constant thicknesses, however, the peripheral portion 216 is more flexible and less stiff (or has less mass) as compared to the center portion 214. In such variable stiffness flyer plates 126, the peripheral portion 216 is accelerated similar to the peripheral portion 216 of the variable thickness flyer plates 126, as described with reference to FIGS. 4A-4C and 6.

FIGS. 21A-21G illustrate examples of variable thickness flyer plates 126 that have a single peripheral portion 216. FIG. 21A is a diagram that illustrates a bottom view of an example of a variable thickness flyer plate 126 having a single peripheral portion 216. Each of FIGS. 21B-21G is a diagram that illustrates a side view of a respective example of the variable thickness flyer plate 126 having the single peripheral portion 216 of FIG. 21A.

In FIG. 21A, the center portion 214 has a first radius 1622 and the flyer plate 126 (or the peripheral portion 216) has a second radius 1624. As illustrated in FIG. 21A, the first radius 1622 of the center portion 214 of FIG. 21A is approximately half of the second radius 1624 of the flyer plate 126. In other implementations the first radius 1622 of the center portion 214 may be larger or smaller, as described with reference to FIG. 22A.

FIGS. 21B-21D each include a single peripheral portion 216 having a single taper to approximately zero thickness 1652 (e.g., tapers to an angled curved edge at a base coupled to the casing 122 rather than tapering to an angled curved edge and including a substantially 90 degree curved edge at the base). FIGS. 21B and 21C include the peripheral portion 216 having a linear and substantially constant taper. Each of FIGS. 21B and 22C has a similar shape. For example, the peripheral portion 216 tapers to an angled curved edge 1662 near or coupled to the casing 122. FIGS. 21B and 21D are relatively thinner examples of flyer plates 126 as compared to FIG. 21C, which is a relatively thicker example of a flyer plate 126. FIG. 21D includes the peripheral portion 216 having a non-linear taper 244 (e.g., a regressive taper or a progressive taper). As illustrated in FIG. 21D, the non-linear taper 244 of the peripheral portion 216 is a progressive taper.

FIGS. 21E-21G each include a single peripheral portion 216 that tapers to a non-zero thickness 1654 (e.g., where the peripheral portion 216 has a substantially 90 degree curved edge at a base coupled to a casing). FIGS. 21E and 21F include a peripheral portion 216 that has a linear taper 244 from a first thickness 262 of a center portion 214 to a second thickness 264 at an edge 218 of the peripheral portion 216 and the flyer plate 126. For example, the peripheral portion 216 includes a substantially 90 degree curved edge 1664 near or coupled to the casing 122.

Each of FIGS. 21E and 21F have similar shapes and thickness ratios. FIG. 21E is a relatively thinner example of the flyer plate 126 of FIG. 21F. As illustrated in FIGS. 21E and 21F, a ratio of the second thickness 264 of the edge 218 of the peripheral portion 216 to the first thickness 262 of the center portion 214 is approximately ⅔. Having the ratio that is approximately ⅔ varies the stiffness (strength, and/or inertia) of the flyer plate 126 from the center portion 214 to the peripheral portion 216 and reduces the impact delay between the center portion 214 and the peripheral portion 216 such that the flyer plate 126 penetrates a target and creates peripheral structural damage, as described with reference to FIGS. 4A-4C and 6.

FIG. 21G includes a peripheral portion 216 that has a non-linear taper 244 (e.g., a regressive taper or a progressive taper). As illustrated in FIG. 21G, the non-linear taper 244 of the peripheral portion 216 is a progressive taper. A particular thickness of the flyer plate 126 or a ratio between the first and second thicknesses 262, 264 of the flyer plate 126, may be greater or lesser than as illustrated in FIGS. 21B-21G. For example, a ratio of the first thickness 262 of the center portion 214 to the second thickness 264 of the peripheral portion 216 (e.g., at the edge 218 of the peripheral portion 216) is within a range of 1.1 to 5. Having the ratio within the range of 1.1 to 5 varies the stiffness (strength, and/or inertia) of the flyer plate 126 from the center portion 214 to the peripheral portion 216 and reduces the impact delay between the center portion 214 and the peripheral portion 216 such that the flyer plate 126 penetrates a target and creates peripheral structural damage, as described with reference to FIGS. 4A-4C and 6.

FIGS. 22A-22G illustrate examples of variable thickness flyer plates 126 that have a single peripheral portion 216. FIG. 22A is a diagram that illustrates a bottom view of another example of a variable thickness flyer plate 126 having a single peripheral portion 216. As compared to FIG. 21A, the center portion 214 of the flyer plate 126 of FIG. 22A is larger.

Referring to FIG. 22A, the center portion 214 has a first radius 1622 and the flyer plate 126 (or the peripheral portion 216) has a second radius 1624. As illustrated in FIG. 22A, the first radius 1622 of the center portion 214 of is approximately 0.9 of the second radius 1624 of the flyer plate 126.

Although two exemplary first radii are illustrated in FIGS. 21A and 22A, in other implementations the first radius of the center portion 214 may be larger or smaller. For example, the flyer plate 126 may have a ratio of the first radius 1622 of the center portion 214 to the second radius 1624 of the flyer plate 126 within a range of values from 0.5 to 0.9. Having the ratio that is approximately within a range of values from 0.5 to 0.9 varies the stiffness (strength, and/or inertia) of the flyer plate 126 from the center portion 214 to the peripheral portion 216 and reduces the impact delay between the center portion 214 and the peripheral portion 216 such that the flyer plate 126 penetrates a target and creates peripheral structural damage, as described with reference to FIGS. 4A-4C and 6.

Each of FIGS. 22B-22G is a diagram that illustrates a side view of a respective example of the variable thickness flyer plate 126 having a single peripheral portion 216 of FIG. 22A. Each of FIGS. 22B-22G corresponds to the respective side views illustrated in FIGS. 21B-21G and are described with reference to FIG. 21.

Figure 23H:
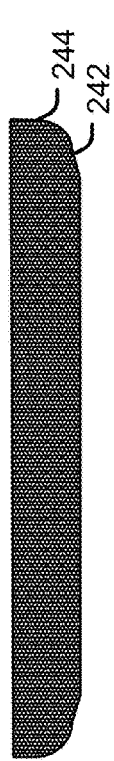
Figure 23I:
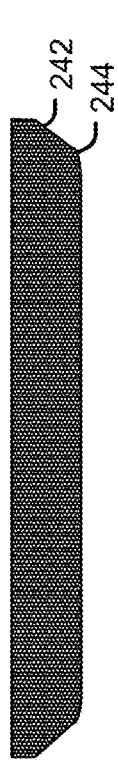
Figure 23J:
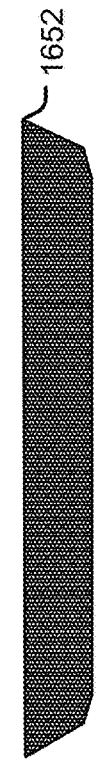
Figure 23K:
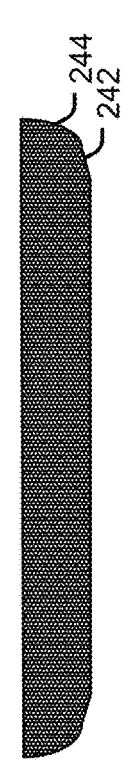
Figure 23L:
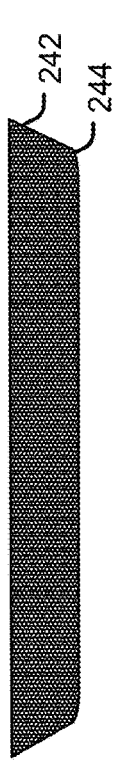
Figure 23M:
Figure 23N:
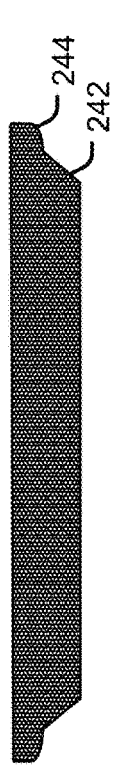
Figure 23O:
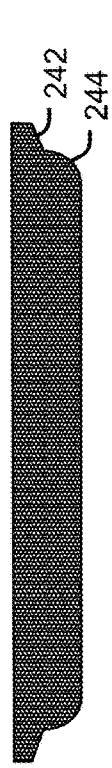
Figure 23P:
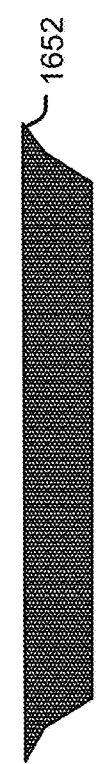
Figure 23Q:
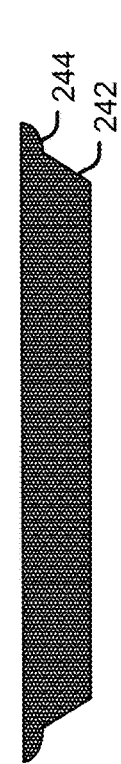
Figure 23R:
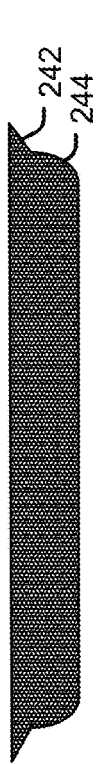

Each of FIGS. 23A-23R illustrate examples of variable thickness flyer plates 126 that have two peripheral portions 216 and 1216. FIG. 23A is a diagram that illustrates a bottom view of an example of a variable thickness flyer plate 126 having two peripheral portions 216, 1216. Each of FIGS. 23B-23R is a diagram that illustrates a side view of a respective example of the variable thickness flyer plate 126 having two peripheral portions 216, 1216.

Referring to FIG. 23A, the variable thickness flyer plate 126 including the peripheral portion 216 (e.g., a first peripheral portion) and a second peripheral portion 1216 around the peripheral portion 216 is depicted. The peripheral portion 216 defines the edge 218 and the second peripheral portion 1216 defines a second edge 1218. In FIG. 23A, the second edge 1218 is peripheral edge of the flyer plate 126. Although the variable thickness flyer plate 126 includes two peripheral portions 216 and 1216 as illustrated in FIG. 23A, in other examples flyer plates 126 may include more than two peripheral portions 216 and 1216. Although a thickness (e.g., an arc thickness) of each of the two peripheral portions 216 and 1216 is approximately equal in FIG. 23A, in other implementations a first arc thickness 1862 of one peripheral portion 216 may be greater a second arc thickness 1864 of the other peripheral portion 1216, as illustrated in FIG. 23B.

Referring to FIGS. 23B-23F, side views of respective examples of the variable thickness flyer plate 126 of FIG. 21A are illustrated. FIGS. 23B-23D each include a second peripheral portion 1216 that includes a peripheral edge (e.g., a second edge) that has a non-zero thickness 1654. FIGS. 23B and 23C include a first peripheral portion 216 having a linear or substantially constant taper followed by a second peripheral portion 1216 having a substantially constant thickness. FIG. 23D includes a first peripheral portion 216 having a non-linear taper 244 followed by a second peripheral portion 1216 having a substantially constant thickness.

FIGS. 23E and 23F each include a second peripheral portion 216 that tapers to approximately zero 1652. FIG. 23E includes a first peripheral portion 216 having a linear taper 242 followed by a second peripheral portion 216 having a non-linear taper 244. FIG. 23F includes a first peripheral portion 216 having a non-linear 244 taper followed by a second peripheral portion 216 having a linear taper 242.

As illustrated in FIGS. 23B-23D, a ratio between a second thickness 264 at the edge 1218 and a first thickness 262 of the center portion 214 is approximately ½. In FIGS. 23E and 23F, a ratio between a third thickness 266 at a first edge 218 of the peripheral portion 216 and the first thickness 262 of the center portion 214 is approximately ½. Having the ratio that is approximately ½ varies the stiffness (strength and/or inertia) of the flyer plate 126 from the center portion 214 to the peripheral portion 216 and reduces the impact delay between the center portion 214 and the peripheral portion 216 such that the flyer plate 126 penetrates a target and creates peripheral structural damage, as described with reference to FIGS. 4A-4C and 6. As explained with reference to FIGS. 21A and 22A, a thickness of (or a ratio between) the center portion 214, the first edge 218, or the second (peripheral) edge 1218 may be greater or lesser than as illustrated in FIGS. 23B-23F.

Referring to FIGS. 23G-23R, side views of additional respective examples of the variable thickness flyer plate 126 of FIG. 21A are illustrated. Each of FIGS. 23G-23I and 23M-23O have a second peripheral portion 1216 that tapers to a non-zero thickness 1654, and each of FIGS. 23J-23L and 23P-23R have a second peripheral portion 1216 that tapers to a thickness of approximately zero 1652.

FIGS. 23G-23I have a first peripheral portion 216 that has a deeper or larger angle taper followed by a second peripheral portion 1216 that has a shallower or smaller angle taper. FIGS. 23M-23O have a first peripheral portion 216 that has a shallower or smaller angle taper followed by a second peripheral portion 1216 that has a deeper or larger angle taper.

FIGS. 23G and 23M include two peripheral portions 216 and 1216 having linear tapers 242 (e.g., substantially constant tapers). FIGS. 23H and 23N include a first peripheral portion 216 that has a linear taper 242 followed by a second peripheral portion 1216 that has a non-linear taper 244. FIGS. 23I and 23O include a first peripheral portion 216 that has a non-linear taper 244 followed by a second peripheral portion 1216 that has a linear taper 242.

FIGS. 23J-23L include a first peripheral portion 216 that has a larger angle taper followed by a second peripheral portion 216 that has a smaller angle taper. FIGS. 23P-23R include a first portion having a first peripheral portion 216 that has shallower or smaller angle taper followed by a second peripheral portion 1216 that has a deeper or larger angle taper.

FIGS. 23J and 23P include two peripheral portions 216 and 1216 that have linear tapers 242. FIGS. 23K and 23Q include a first peripheral portion 216 that has a linear taper 242 followed by a second peripheral portion 1216 that has a non-linear taper 244. FIGS. 23L and 23R include a first peripheral portion 216 that has a non-linear taper 244 followed by a second peripheral portion 1216 that has a linear taper 242.

Each of FIGS. 23G-23R illustrate relatively thick flyer plates, as compared to the flyer plates 126 of FIGS. 23B-23F, to more clearly illustrate the tapers of the peripheral portions 216 and 1216 and the different shapes of the variable thickness flyer plates 126. In other implementations, the flyer plates 126 may be thinner or thicker than as illustrated in FIGS. 23G-23R and may have different thickness ratios, as described with reference to FIGS. 21A and 22A.

Additionally, features or components of two or more of the examples of variable stiffness flyer plates 126 described with reference to FIGS. 7A-23R may be combined. For example, a flyer plate 126 having a tapered peripheral portion 216 may additionally include one or more recesses 222 in the tapered peripheral portion 216 and corresponds to an example of the flyer plate 126 having a recess 222 and to an example of the variable thickness flyer plate 126. As another example, a flyer plate 126 having a center portion 214 including a first material 914 having a first density 924 and a peripheral portion 216 of the flyer plate 126 including a second material 916 having a second density 926 that is different than the first density 924 also includes as a tapered peripheral portion 216 and corresponds to an example of the variable thickness flyer plate 126 and to an example of the variable density flyer plate 126.

Figure 24:
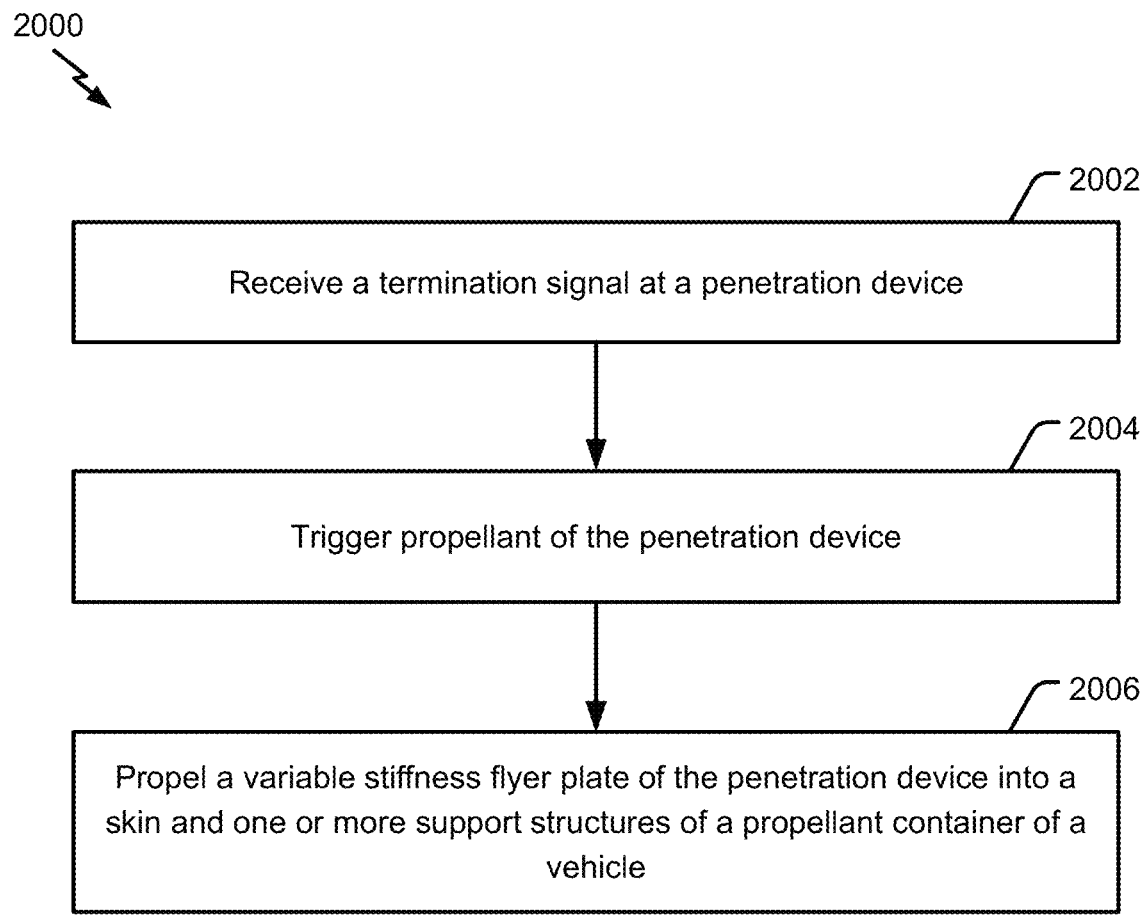
FIG. 24 is a flow chart of an example of a method of terminating flight of a vehicle.

FIG. 24 is a flowchart of a method 2000 of terminating flight of a vehicle. The method 2000 may be performed by the vehicle 102, the propulsion system 104, the flight computer 106, the flight termination controller 108, the penetration device 110 of FIG. 1, or a combination thereof. The method 2000 includes, at 2002, receiving a termination signal at a penetration device. For example, the penetration device 110 receives a flight termination command from the flight computer 106 or the flight termination controller 108 of FIG. 1. In some implementations, the flight computer 106 sends the flight termination command to the penetration device 110 of FIG. 1 (or the flight termination controller 108 thereof). The flight termination command may be generated based on comparing the sensor data 156 to one or more flight termination thresholds or responsive to receiving a flight termination input, as described with reference to FIG. 1. In other implementations, the flight termination controller 108 sends a flight termination command to the penetration device 110 of FIG. 1 independent of the flight computer 106.

The method 2000 of FIG. 24 also includes, at 2004, triggering propellant of the penetration device. For example, the flight termination controller 108 or the penetration device 110 ignites, activates, or detonates the propellant 124 of FIG. 1 responsive to receiving the flight termination command.

The method 2000 of FIG. 24 includes, at 2006, propelling a variable stiffness flyer plate of the penetration device into a skin and one or more support structures of a propellant container of a vehicle. For example, triggering the propellant 124 generates a force that detaches the flyer plate 126 from the casing 122 and propels the flyer plate 126 into the propellant container 112 of the vehicle 102 of FIG. 1. For example, the flyer plate 126, such as the flyer plate having a recess, the variable stiffness flyer plate, the variable density flyer plate, or a combination thereof, impacts the skin 132 and one or more supports of the plurality of supports 134 of FIG. 1. In some implementations, the variable stiffness flyer plate includes a center portion having a substantially constant first thickness and a peripheral portion around the center portion and defining an edge. The peripheral portion includes one or more recesses in a first surface of the peripheral portion, as described with reference to FIGS. 7A-14.

In another implementation, the variable stiffness flyer plate includes a center portion having a first density and a peripheral portion around the center portion and defining an edge. The peripheral portion including multiple regions having a second density, and the first density is different than the second density, as described with reference to FIGS. 7A-18C.

In other implementations, the variable stiffness flyer plate includes a center portion having a substantially constant first thickness and includes a peripheral portion around the center portion and defining an edge. The peripheral portion tapers from the first thickness to a second thickness at the edge, and the second thickness is less than the first thickness, as described with reference to FIGS. 21A-23R. In some implementations, the flyer plate includes a second peripheral portion around the peripheral portion defining a second edge, such as the second peripheral portion 1216 that defines the second edge 1218, as described with reference to FIGS. 23A-23R.

In a particular implementation, the second peripheral portion includes one or more second recesses, as described with reference to FIGS. 9A-9F. The one or more recesses of the peripheral portion may have a first dimension that is different than a second corresponding dimension of the one or more second recesses. For example, the one or more recesses may be deeper or have a lesser thickness than the one or more second recesses. As another example, the one or more recesses may have a greater diameter than the one or more second recesses.

In some implementations, the skin 132 corresponds to a rocket casing of a solid rocket motor and the plurality of supports 134 correspond to ribs of the rocket casing. In other implementations, the skin 132 corresponds to an exterior surface of a pressurized tank (e.g., a fuel tank, an oxidizer tank, or a monopropellant tank) of a liquid rocket motor and the plurality of supports 134 correspond to ribs of the pressurized tank. In a particular implementation, the skin 132 of the propellant container 112 corresponds to a skin or exterior surface of the vehicle 102.

In some implementations, the method 2000 further includes triggering propellant of one or more other penetration devices responsive to receiving a flight termination input or determining that a flight termination condition has been satisfied. For example, a flight termination system including multiple penetration devices 110 in communication with the flight termination controller 108 receives a flight termination input from an operator, generates multiple flight termination commands, and transmits the commands to the multiple penetration devices 110, as described with reference to FIG. 1.

In some implementations, the method 2000 further includes arming the penetration device. For example, the flight termination controller 108 may arm the penetration device 110 before or during operation of the vehicle 102, as described with reference to FIG. 1.

In some implementations, propelling the variable stiffness flyer plate causes the variable stiffness flyer plate to impact the skin and the one or more support structures to puncture the skin and sever the one or more support structures. For example, the flyer plate 126 of FIG. 1 punctures a hole in the skin 132, generates structural or residual damage (e.g., bending stresses) in the skin 132 in proximity to the hole, and severs one or more supports of the plurality of supports 134. In a particular implementation, the flyer plate 126 severs a particular interconnect 136 of the one or more interconnects 136. For example, the flyer plate 126 severs and detaches the skin 132 and the one or more structures of the plurality of supports 134 from each other. As another examples, the flyer plate 126 severs and detaches the skin 132 and the one or more supports of the plurality of supports 134 from a joint or a coupling device, such as particular interconnect 136 of the one or more interconnects 136.

In some implementations, the peripheral portion impacts the skin within a threshold period of time after the center portion impacts the skin. For example, the peripheral portion 216 strikes the skin 132 at substantially the same time as the center portion, as described with reference to FIGS. 1, 4A-4C, and 6. As an exemplary, non-limiting illustration, the peripheral portion 216 strikes the skin 132 shortly after the center portion 214 (e.g., while the center portion 214 is applying a load to the target), as described with reference to FIG. 6. The peripheral portion 216 impacting the target within a threshold period of time applies a higher vertical load to the target (e.g., the skin 132 and supports 134) than is applied at impact of the center portion 214. Additionally, the peripheral portion 216 impacting the target within the threshold period of time applies bending stresses to the target, in addition to severing the target. The bending stresses are also caused by the stiffness, the strength and the inertia of the flyer plate 126. Accordingly, the flyer plate 126 generates a deformed hole rather than a clean puncture, as illustrated in FIGS. 4A-8C.

In some implementations, the flyer plate has a unitary structure comprised of a first material, as described with reference to FIGS. 9A-10C and 21A-23R. In other implementations, the flyer plate has a base structure comprised of a first material and one or more inserts comprised of a second material, as described with reference to FIGS. 7A-19F. The second material has a second density that is greater than or less than a first density of the first material. Additionally or alternatively, the flyer plate includes one or more supports or stiffeners, such as the supports 1514 described with reference to FIG. 20A.

In some implementations, the flyer plate has a linear taper, a non-linear taper, or a combination thereof, as described with reference to FIGS. 21A-23R. The linear taper includes a constant or substantially constant taper within manufacturing tolerances. The non-linear taper includes a substantially progressive or regressive taper within manufacturing tolerances. The non-linear taper may have a constant or variable rate of change in taper.

The variable stiffness flyer plate 126 may include or correspond to the examples of flyer plates 126 as described with reference to FIGS. 9A-23R. In some implementations, the one or more recesses of the variable stiffness flyer plate 126 may include or correspond to though holes. In a particular implementation, the one or more recesses include portions of a peripheral edge of the flyer plate, as described with reference to FIGS. 10A-14. In other implementations, the one or more recesses of the variable stiffness flyer plate may include or correspond to blind holes. In a particular implementation, the blind holes are filled with a second material that has second density that is different (e.g., less) than a first density of a first material of the center and peripheral portions.

In some implementations, the propellant is configured to propel the flyer plate through the skin to generate a hole and peripheral structural damage around the hole in the skin, as described with reference to FIGS. 4A-4C and 6. In a particular implementation, the propellant is configured to accelerate the peripheral portion such that the peripheral portion impacts the skin within a threshold period of time after the center portion impacts the skin, as described with reference to FIG. 6.

Figure 25:
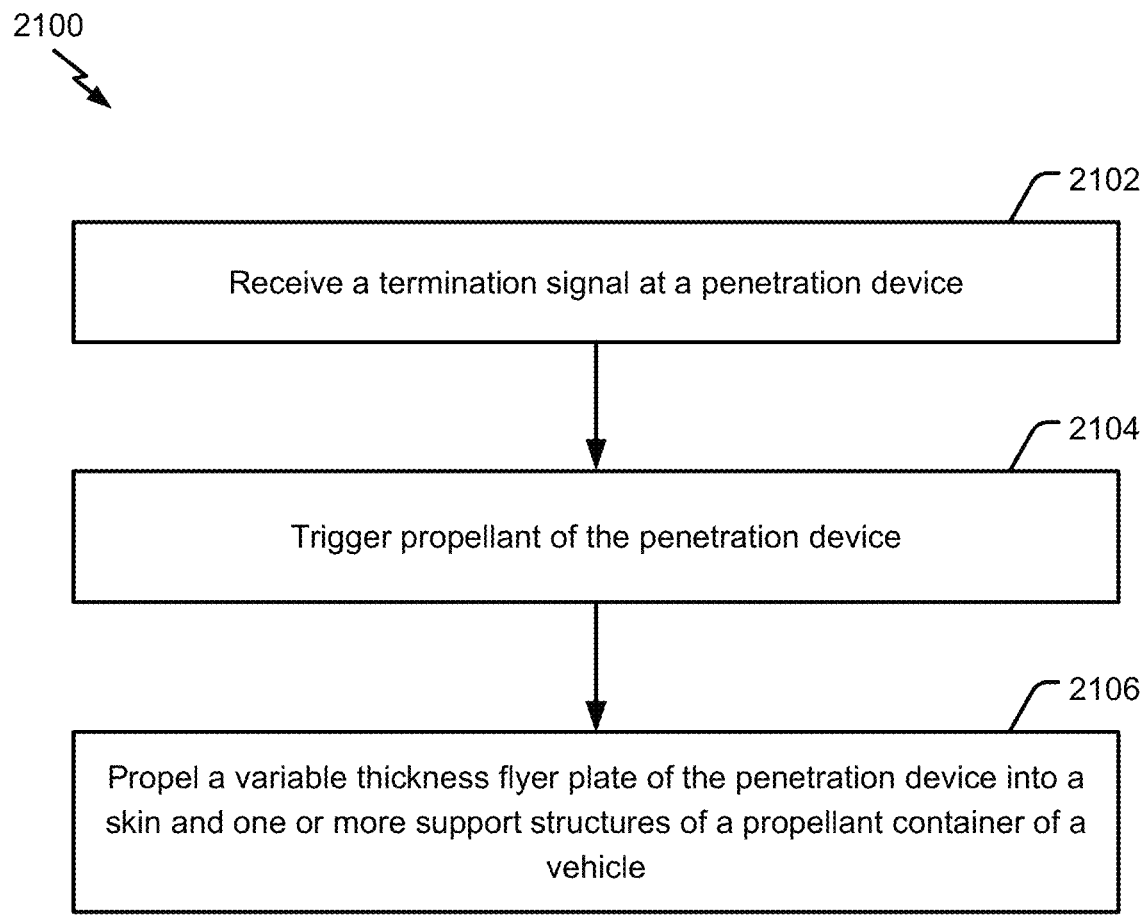
FIG. 25 is a flow chart of another example of a method of terminating flight of a vehicle.

FIG. 25 is a flowchart of another method 2100 of terminating flight of a vehicle. The method 2100 may be performed by the vehicle 102, the propulsion system 104, the flight computer 106, the flight termination controller 108, the penetration device 110 of FIG. 1, or a combination thereof. The method 2100 includes, at 2102, receiving a termination signal at a penetration device. For example, the penetration device 110 receives a flight termination command from the flight computer 106 or the flight termination controller 108 of FIG. 1. In some implementations, the flight computer 106 sends the flight termination command to the penetration device 110 of FIG. 1 (or the flight termination controller 108 thereof). The flight termination command may be generated based on comparing the sensor data 156 to one or more flight termination thresholds or responsive to receiving a flight termination input, as described with reference to FIG. 1. In other implementations, the flight termination controller 108 sends a flight termination command to the penetration device 110 of FIG. 1 independent of the flight computer 106.

The method 2100 of FIG. 25 also includes, at 2104, triggering propellant of the penetration device. For example, the flight termination controller 108 or the penetration device 110 ignites, activates, or detonates the propellant 124 of FIG. 1 responsive to receiving the flight termination command.

The method 2100 of FIG. 25 includes, at 2106, propelling a variable thickness flyer plate of the penetration device into a skin and one or more support structures of a propellant container of a vehicle. The variable thickness flyer plate includes a center portion having a substantially constant first thickness and includes a peripheral portion around the center portion and defining an edge. The peripheral portion tapers from the first thickness to a second thickness at the edge, and the second thickness is less than the first thickness. For example, triggering the propellant 124 generates a force that detaches the variable thickness flyer plate 126 from the casing 122 and propels the variable thickness flyer plate 126 into the propellant container 112 of the vehicle 102 of FIG. 1. For example, the variable thickness flyer plate 126 impacts the skin 132 and one or more supports of the plurality of supports 134 of FIG. 1. In some implementations, the peripheral portion of the flyer plate has less mass and stiffness per unit area than the center portion of the flyer plate. For example, the peripheral portion of the flyer plate has a first stiffness and inertia that is less than a second stiffness and inertia of the center portion of the flyer plate. Additionally or alternatively, the flyer plate 126 includes a second peripheral portion around the peripheral portion defining a second edge, such as the second peripheral portion 1216 that defines the second edge 1218 as described with reference to FIGS. 23A-23R.

In some implementations, a tapered surface of the peripheral portion faces away from the propellant. For example, the surface facing a target and facing away from the propellant 124, such as the first surface 232 or the second surface 234 of FIG. 2C, includes a taper as described with reference to FIGS. 3A-3C. In other implementations, the surface of the peripheral portion faces the propellant.

In some implementations, the center portion of the flyer plate includes a first material having a first density, and the peripheral portion of the flyer plate includes a second material having a second density different from the first density. In a particular implementation, the first density is greater than the second density. The method 2100 of FIG. 25 may include one or more additional steps, such as the steps described with reference to FIG. 24, and one or more additional features as described with reference to FIG. 24.

Figure 26:
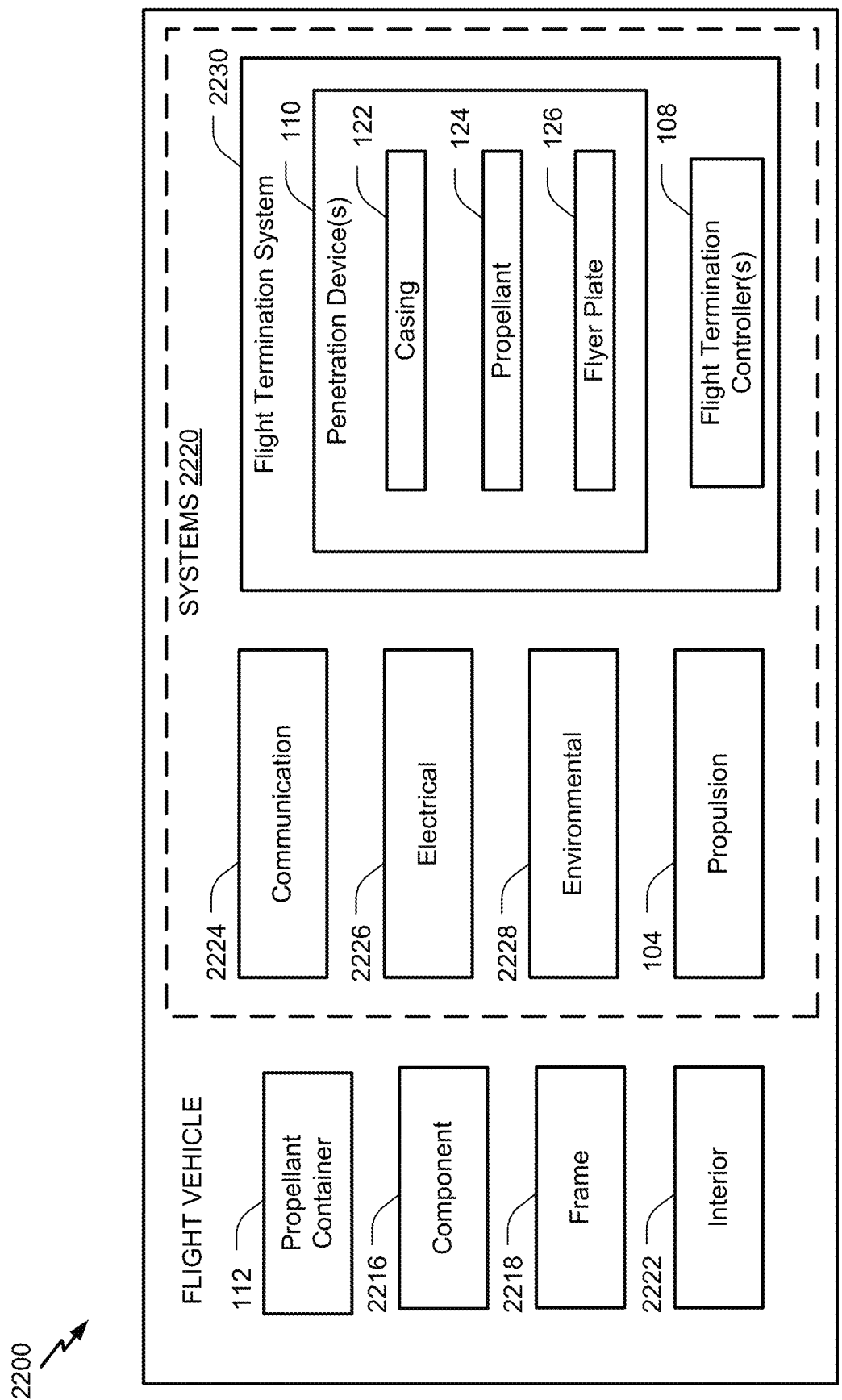
FIG. 26 is an illustration of a block diagram of a spacecraft including a penetration device having a variable stiffness flyer plate.

Referring to FIG. 26, a block diagram of an illustrative implementation of a flight vehicle 2200 that includes a flight termination system 2230 is depicted. The flight vehicle 2200 may include or correspond to the vehicle 102 of FIG. 1. For example, in a particular implementation, the flight vehicle 2200 corresponds to a spacecraft and the vehicle 102 corresponds to a rocket attached to the flight vehicle 2200, such as a booster rocket. Additional or alternatively, the flight vehicle 2200 may include or correspond to an aircraft, a spacecraft, a spaceplane, a rocket, or a rocket-propelled projectile. The flight vehicle 2200 may be manned or unmanned (e.g., an autonomous rocket or a remote controlled rocket). In some implementations, the flight vehicle 2200 includes multiple penetration devices 110.

As shown in FIG. 26, the flight vehicle 2200 may include the propellant container 112, a component 2216, a frame 2218, an interior 2222, and a plurality of systems 2220. The component 2216 may include or correspond to a propellant feed line, the propellant container 112, a support strut of the flight vehicle 2200, the frame 2218, or a fuselage of the flight vehicle 2200. The plurality of systems 2220 may include one or more of the propulsion system 104, a communication system 2224, an electrical system 2226, or an environmental system 2228.

The flight termination system 2230 of the plurality of systems 2220 includes one or more penetration devices 110 and one or more flight termination controllers 108. The penetration device 110 includes the casing 122, the propellant 124, and the flyer plate 126.

In some implementations, each penetration device 110 has and is controlled by a corresponding flight termination controller 108. In other implementations, a particular flight termination controller 108 corresponds to and controls multiple penetration devices 110 of the flight termination system 2230. The flight termination system 2230 may include penetration devices 110 that are positioned in proximity to multiple types of targets. For example, the flight termination system 2230 includes a first set of penetration devices 110 in proximity to the propellant container 112 and a second set of penetration devices 110 to the component 2216.

The penetration device 110 may be communicatively coupled to a control system of the flight vehicle 2200, such as the flight computer 106, the flight termination controller 108 of FIG. 1, or both. The control system may be configured to execute computer-executable instructions (e.g., a program of one or more instructions) stored in a memory. The instructions, when executed, cause the control system, to perform one or more operations of the method 2000 of FIG. 24, the method 2100 of FIG. 25, or a combination thereof. The penetration device 110 may be positioned in proximity to the propellant container 112, the component 2216, or the frame 2218, of the flight vehicle 2200. The penetration device 110 is configured to sever a portion of the component 2216 or the frame 2218 or to puncture a hole in the skin 132 and sever one or more supports of the plurality of supports 134 of the propellant container 112.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A penetration device comprising:
   a casing;
   a propellant positioned in the casing; and
   a flyer plate coupled to the casing and adjacent to the propellant, the flyer plate comprising:
      a center portion having a substantially constant first thickness; and
      a peripheral portion around the center portion and defining an edge, the peripheral portion including one or more recesses in a first surface of the peripheral portion.

2. The penetration device of claim 1, wherein the one or more recesses comprise through holes.

3. The penetration device of claim 2, wherein the through holes have a shape of a circle, a triangle, a rectangle, a square, a star, a diamond, a cone, or a combination thereof.

4. The penetration device of claim 1, wherein the edge of the peripheral portion comprises a peripheral edge of the flyer plate, and wherein the one or more recesses comprise notches, teeth, or scallops in the peripheral edge.

5. The penetration device of claim 1, wherein the one or more recesses comprise blind holes.

6. The penetration device of claim 5, wherein the first surface faces away from the propellant and the casing.

7. The penetration device of claim 5, wherein the one or more recesses comprise one or more concentric channels.

8. The penetration device of claim 1, further comprising one or more second recesses in a second surface of the peripheral portion, wherein the second surface faces the propellant and the casing.

9. The penetration device of claim 1, wherein the first thickness of the center portion is approximately twice a second thickness of the one or more recesses.

10. The penetration device of claim 1, wherein a first radius of the center portion is approximately ⅔ of a second radius of the flyer plate.

11. The penetration device of claim 1, wherein a ratio of a second thickness of the one or more recesses to the first thickness of the center portion is within a range of 0.1 to 0.9, and wherein a ratio of a first radius of the center portion to a second radius of the flyer plate is within a range of 0.5 to 0.9.

12. The penetration device of claim 1, wherein the one or more recesses are arranged in a pattern around a center of the flyer plate.

13. The penetration device of claim 1, wherein the peripheral portion of the flyer plate has a first stiffness that is less than a second stiffness of the center portion of the flyer plate.

14. The penetration device of claim 1, wherein the flyer plate has a unitary structure comprised of a metal, an alloy, or a ceramic.

15. The penetration device of claim 1, the flyer plate further comprising a second peripheral portion around the peripheral portion and defining a peripheral edge of the flyer plate, the second peripheral portion including one or more second recesses, the one or more recesses having a first dimension that is different than a second corresponding dimension of the one or more second recesses.

16. A flight vehicle comprising:
   a component including a skin and a plurality of support structures; and
   a penetration device in proximity to the skin and one or more support structures of the plurality of support structures, the penetration device comprising:
      a casing;
      a propellant positioned in the casing; and
      a flyer plate coupled to the casing and adjacent to the propellant, the flyer plate comprising:
         a center portion having a substantially constant first thickness; and
         a peripheral portion around the center portion and defining an edge, the peripheral portion including one or more recesses in a first surface of the peripheral portion.

17. The flight vehicle of claim 16, wherein the component comprises a propellant container and the plurality of support structures comprises a rib of the propellant container, and wherein the penetration device is configured to sever the rib.

18. The flight vehicle of claim 16, wherein the propellant is configured to propel the flyer plate through the skin to generate a hole and peripheral structural damage around the hole in the skin, and wherein the propellant is configured to accelerate the peripheral portion such that the peripheral portion impacts the skin within a threshold period of time after the center portion impacts the skin.

19. A method of terminating flight of a vehicle, the method comprising:
   receiving a termination signal at a penetration device;
   triggering a propellant of the penetration device;
   propelling a variable stiffness flyer plate of the penetration device into a skin and one or more support structures of a propellant container of the vehicle, the variable stiffness flyer plate comprising:
      a center portion having a substantially constant first thickness; and
      a peripheral portion around the center portion and defining an edge, the peripheral portion including one or more recesses in a first surface of the peripheral portion.

20. The method of claim 19, wherein propelling the variable stiffness flyer plate causes the variable stiffness flyer plate to impact the skin and the one or more support structures to puncture the skin and sever the one or more support structures.

21. A penetration device comprising:
   a casing;
   a propellant positioned in the casing; and
   a flyer plate coupled to the casing and adjacent to the propellant, the flyer plate comprising:
      a center portion having a first density; and
      a peripheral portion around the center portion and defining an edge, the peripheral portion including a plurality of filled recesses, wherein recesses of the filled recesses are filled with a material having a second density, and wherein the first density is different than the second density.

22. The penetration device of claim 21, wherein the second density is greater than the first density.

* * * * *